United States Patent
Laadan et al.

(10) Patent No.: US 8,280,944 B2
(45) Date of Patent: Oct. 2, 2012

(54) METHODS, MEDIA AND SYSTEMS FOR MANAGING A DISTRIBUTED APPLICATION RUNNING IN A PLURALITY OF DIGITAL PROCESSING DEVICES

(75) Inventors: Oren Laadan, New York, NY (US); Jason Nieh, New York, NY (US); Dan Phung, Montclair, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 632 days.

(21) Appl. No.: 11/584,313

(22) Filed: Oct. 20, 2006

(65) Prior Publication Data

US 2007/0244962 A1    Oct. 18, 2007

Related U.S. Application Data

(60) Provisional application No. 60/729,093, filed on Oct. 20, 2005, provisional application No. 60/729,094, filed on Oct. 20, 2005, provisional application No. 60/729,096, filed on Oct. 20, 2005.

(51) Int. Cl.
*G06F 15/16* (2006.01)
*G06F 15/173* (2006.01)
*G06F 9/46* (2006.01)

(52) U.S. Cl. ........ 709/202; 709/201; 709/203; 709/223; 709/224; 709/225; 709/226; 718/102; 718/104; 718/105

(58) Field of Classification Search .......... 709/201–203, 709/223–226; 718/102, 104, 105
See application file for complete search history.

(56) References Cited

U.S. PATENT DOCUMENTS

| 5,359,730 | A | 10/1994 | Marron |
| 6,076,108 | A | 6/2000 | Courts et al. |
| 6,098,093 | A | 8/2000 | Bayeh et al. |
| 6,134,592 | A | 10/2000 | Montulli |
| 6,141,686 | A | 10/2000 | Jackowski et al. |
| 6,182,139 | B1 * | 1/2001 | Brendel ................. 709/226 |
| 6,336,142 | B1 | 1/2002 | Kato et al. |
| 6,349,337 | B1 | 2/2002 | Parsons, Jr. et al. |
| 6,366,558 | B1 * | 4/2002 | Howes et al. ............ 370/219 |
| 6,442,663 | B1 * | 8/2002 | Sun et al. ............... 711/202 |
| 6,567,918 | B1 | 5/2003 | Flynn et al. |
| 6,795,966 | B1 * | 9/2004 | Lim et al. ............... 718/1 |

(Continued)

OTHER PUBLICATIONS

P. Barham et al., "Xen and the Art of Virtualization," Proceedings of the 19th ACM Symposium on Operating Systems Principles, Oct. 2003.

(Continued)

*Primary Examiner* — Luat Phung
*Assistant Examiner* — Kai Chang
(74) *Attorney, Agent, or Firm* — Byrne Poh LLP

(57) ABSTRACT

Methods, media and systems for managing a distributed application running in a plurality of digital processing devices are provided. In some embodiments, a method includes running one or more processes associated with the distributed application in virtualized operating system environments on a plurality of digital processing devices, suspending the one or more processes, and saving network state information relating to network connections among the one or more processes. The method further include storing process information relating to the one or more processes, recreating the network connections using the saved network state information, and restarting the one or more processes using the stored process information.

13 Claims, 7 Drawing Sheets

U.S. PATENT DOCUMENTS

| | | | |
|---|---|---|---|
| 7,010,605 B1 | 3/2006 | Dharmarajan | |
| 7,028,179 B2 | 4/2006 | Anderson | |
| 7,054,960 B1* | 5/2006 | Bezbaruah et al. | 710/33 |
| 7,080,221 B1* | 7/2006 | Todd et al. | 711/161 |
| 7,188,366 B2 | 3/2007 | Chen et al. | |
| 7,203,944 B1* | 4/2007 | van Rietschote et al. | 718/104 |
| 7,251,812 B1 | 7/2007 | Jhanwar et al. | |
| 7,257,811 B2 | 8/2007 | Hunt et al. | |
| 7,389,539 B1 | 6/2008 | Kouznetsov | |
| 7,512,769 B1 | 3/2009 | Lowell et al. | |
| 7,730,486 B2* | 6/2010 | Herington | 718/1 |
| 2002/0107973 A1 | 8/2002 | Lennon et al. | |
| 2002/0120853 A1 | 8/2002 | Tyree | |
| 2003/0074487 A1 | 4/2003 | Akgul et al. | |
| 2003/0088680 A1* | 5/2003 | Nachenberg et al. | 709/229 |
| 2003/0154289 A1 | 8/2003 | Williamson et al. | |
| 2003/0187915 A1* | 10/2003 | Sun et al. | 709/201 |
| 2003/0195963 A1 | 10/2003 | Song et al. | |
| 2004/0055004 A1* | 3/2004 | Sun et al. | 718/108 |
| 2004/0068567 A1 | 4/2004 | Moran et al. | |
| 2004/0103172 A1 | 5/2004 | Chen et al. | |
| 2004/0148520 A1 | 7/2004 | Talpade | |
| 2004/0172626 A1* | 9/2004 | Jalan et al. | 717/149 |
| 2005/0066019 A1 | 3/2005 | Egan et al. | |
| 2005/0144181 A1 | 6/2005 | Kii et al. | |
| 2005/0251802 A1* | 11/2005 | Bozek et al. | 718/1 |
| 2005/0262411 A1* | 11/2005 | Vertes et al. | 714/741 |
| 2006/0089990 A1 | 4/2006 | Ng et al. | |
| 2006/0173980 A1 | 8/2006 | Kobayashi et al. | |
| 2007/0233880 A1 | 10/2007 | Nieh et al. | |

OTHER PUBLICATIONS

A. Baumann et al., "Providing dynamic update in an operating system," USENIX 2004, pp. 279-291, Apr. 2005.

O. Kephart et al., The vision of autonomic computing, IEEE Computer, pp. 41-50, Jan. 2003.

D. Lowell et al., Devirtualizable virtual machines enabling general, single-node, online maintenance, Eleventh International Conference on Architectural Support for Programming Languages and Operating Systems, Oct. 2004.

D. Price et al., "Solaris zones: Operating system support for consolidating commercial workloads," 18th Large Installation System Administration Conference (LISA 2004), Nov. 2004.

E. Rescorla, "Security holes . . . Who cars?" Proceedings of the 12th USENIX Security Conference, Aug. 2003.

J. Saltzer et al., "The Protection of Information in Computer Systems," Proceedings of the IEEE, vol. 63, No. 9, pp. 1278-1308, Sep. 1975.

P. Smith et al., "Heterogeneous process migration: The Tui system," Software—Practice and Experience, vol. 28, No. 6, pp. 611-639, 1998.

M. Swift et al., "Improving the reliability of commodity operating systems," SOSP '03: Proceedings of the Nineteenth ACM Symposium on Operating System Principles, pp. 207-222, Oct. 2003.

A. Whitaker et al., "Scale and Performance in the Denali Isolation Kernel," Proceedings of the Fifth Symposium on Operating System Design and Implementation (OSDI 2002), Dec. 2002.

K. Appleby et al., "Oceano: SLA based Management of a Computing Utility," In Proceedings of IFIP/IEEE International Symposium on Integrated Network Management, May 2001.

P. Bhagwat et al., "A Mobile Networking System based on Internet Protocol (IP)," In Proceedings of USENIX Symposium on Mobile and Location Independent Computing, Aug. 1993.

I. Foster et al., "The Physiology of the Grid: An Open Grid Services Architecture for Distributed Systems Integration," In Open Grid Service Infrastructure WG, Global Grid Forum, Jun. 2002.

D. Gannon et al., "Programming the Grid: Distributed Software Components, P2P and Grid Web Services for Scientific Applications," Cluster Computing, 5(3), 2002.

M. Handley et al., "TCP Congestion Window Validation," Network Working Group, Request for Comments: 2861, Jun. 2000.

J. Ioannidis et al., "IP-based Protocols for Mobile Internetworking," In Proceedings of ACM SIGCOMM, pp. 235-245, 1991.

A. Lai et al., "Limits of Wide-Area Thin-Client Computing," In Proceedings of the ACM International Conference on Measurement and Modeling of Computer Systems (SIGMETRICS 2002), pp. 228-239, Jun. 2002.

D. Mosberger et al., "httperf—A Tool for Measuring Web Server Performance," HP Research Labs, 1998.

S. Narayanaswamy et al., "Application and Network Support for InfoPad," IEEE Personal Communications, Mar. 1996.

J. Nieh et al., "Measuring Thin-Client Performance Using Slow-Motion Benchmarking," ACM Transactions on Computer Systems (TOCS), 21(1):87-115, Feb. 2003.

R. Scheifler et al., "The X Window System," ACM Transactions on Graphics, vol. 5, No. 2, pp. 79-109, Apr. 1986.

F. Sultan al., "Migratory TCP: Highly Available Internet Services Using Connection Migration," In Proceedings of ICDCS, pp. 17-26, 2002.

F. Teraoka et al., "A Network Architecture Providing Host Migration Transparency," In Proceedings of ACM SIGCOMM, May 1991.

P. Yalagandula et al., "Transparency Mobility with Minimal Infrastructure," In Technical Report 01-30, University of Texas at Austin, Jun. 2001.

V. Zandy et al., "A Persistent Connection Model for Mobile and Distributed Systems," In Proceedings of 8th ACM International Conference on Mobile Computing and Networking (MOBICOM '02), Sep. 2002.

M. Archer et al., "Towards a Methodology and Tool for the Analysis of Security-Enhanced Linux Security Policies," NRL Memorandum Report, NRL/MR/5540, 02-8629, 2002.

A. Baratloo et al., "Transparent Run-Time Defense Against Stack Smashing Attacks," In Proceedings of the USENIX Annual Technical Conference, Jun. 2000.

C. Cowan et al., "SubDomain: Parsimonious Server Security," In 14th USENIX Systems Administration Conference (LISA 2000), Dec. 2000.

C. Cowan et al., "StackGuard: Automatic Adaptive Detection and Prevention of Buffer-Overflow Attacks," In Proceeding 7th USENIX Security Conference, pp. 63-78, Jan. 1998.

T. Garfinkel, "Traps and Pitfalls: Practical Problems in System Call Interposition Based Security Tools," In Proceedings of the Network and Distributed Systems Security Symposium, Feb. 2003.

T. Garfinkel et al., "Terra: A virtual machine-based platform for trusted computing," In Proceedings of the 19th Symposium on Operating System Principles (SOSP 2003), Oct. 2003.

C. Landwehr, "Formal Models for Computer Security," ACM Computing Surveys, 13(3):247-278, Sep. 1981.

P. Loscocco et al., "Integrating Flexible Support for Security Policies into the Linux Operating System," In Proceedings of the FREENIX Track: 2001 USENIX Annual Technical Conference, Jun. 2001.

N. Provos, "Improving Host Security with System Call Policies," In 12th USENIX Security Symposium, Aug. 2003.

N. Provos et al., "Preventing privilege escalation," In 12th USENIX Security Symposium, Aug. 2003.

R. Spencer et al., "The Flask Security Architecture: System Support for Diverse Security Policies," In Proceedings of the Eighth USENIX Security Symposium, Aug. 1999.

D. Wagner, "Janus: an approach for confinement of untrusted applications," Master's Thesis, University of California, Berkeley, 1999.

E. Zadok et al., "FiST: A Language for Stackable File Systems," In Proceedings of the Annual USENIX Technical Conference, pp. 55-70, Jun. 2000.

R. Baratto, J. Nieh, and L. Kim, "THINC: A Remote Display Architecture for Thin-Client Computing," Technical Report CUCS-027-04, Department of Computer Science, Columbia University, Jul. 2004.

P.-H. Kamp and R. N. M. Watson, "Jails: Confining the omnipotent root," In 2nd International SANE Conference, MECC, Maastricht, The Netherlands, May 2000.

M. Raghunath, C. Narayanaswami, C. Caster, and R. Caceres, "Reincarnating PCs with Portable SoulPads," Technical Report RC23418 (W0411-057), IBM Research Division,Thomas J. Watson Research Center, Nov. 8, 2004.

A. Tucker and D. Comay, "Solaris Zones: Operating system support for server consolidation," Sun Microsystems, Inc., May 2004.

K. Amiri, D. Petrou, G. Ganger, and G. Gibson, "Dynamic Function Placement in Active Storage Clusters," Technical Report CMU-CS-99-140, School of Computer Science, Carnegie Mellon University, Jun. 1999.

A. Barak and R. Wheeler, "MOSIX: An Integrated UNIX for Multiprocessor Workstations," ICSI Technical Report TR-88-004, International Computer Science Institute, University of California at Berkeley, Oct. 1988.

P. Bhagwat, C. Perkins, and S. Tripathi, "Network Layer Mobility: An Architecture and Survey," IEEE Personal Communications, 3(3):54-64, Jun. 1996.

T. Boyd and P. Dasgupta, "Process Migration: A Generalized Approach Using a Virtualized Operating System," Proceedings of the 22nd International Conference on Distributed Computing Systems (ICDCS 2002), Vienna, Austria, Jul. 2002.

J. Casas, D. L. Clark, R. Conuru, S. W. Otto, R. M. Prouty, and J. Walpole, MPVM: A Migration Transparent Version of PVM, Computing Systems, 8(2):171-216, 1995.

D. Cheriton, "The V Distributed System," Communications of the ACM, 31(3):314-333, Mar. 1988.

F. Douglis and J. Ousterhout, "Transparent Process Migration: Design Alternatives and the Sprite Implementation," Software—Practice and Experience, 21(8):757-785, Aug. 1991.

I. Foster and C. Kesselman, "Globus: A Metacomputing Infrastructure Toolkit," Proceedings of the Workshop on Environments and Tools for Parallel Scientific Computing, Lyon, France, Aug. 1996.

A. Grimshaw and W. Wulf, "The Legion Vision of a Worldwide Virtual Computer," Communications of the ACM, 40(1):39-45, Jan. 1997.

C. E. Perkins and D.B. Johnson, "Mobility Support in IPv6," MOBICOM 96, pp. 27-37, Rye, NY, 1996.

C. Perkins, "IP Mobility Support for IPv4," Network Working Group, Request for Comments: 3344, Aug. 2002.

A. D. Joseph, J. A. Tauber, and M. F. Kaashoek, "Mobile Computing with the Rover Toolkit," IEEE Transactions on Computers, 46(3):337-352, Mar. 1997.

J. Jung, E. Sit, H. Balakrishnan, and R. Morris, "DNS Performance and the Effectiveness of Caching," Proceedings of ACM, SIGCOMM Internet Measurement Workshop, pp. 153-167, San Francisco, CA, Nov. 2001.

M. Kozuch and M. Satyanarayanan, "Internet Suspend/Resume," Fourth IEEE Workshop on Mobile Computing Systems and Applications, Calicoon, NY, Jun. 2002.

M. Litzkow, T. Tannenbaum, J. Basney, and M. Livny, "Checkpoint and Migration of UNIX Processes in the Condor Distributed Processing System," Computer Sciences Technical Report #1346, Computer Sciences Department, University of Wisconsin—Madison, Apr. 1997.

D. A. Maltz and P. Bhagwat, "MSOCKS: An Architecture for Transport Layer Mobility," Proceedings of the IEEE INFOCOM '98, pp. 1037-1045, San Francisco, CA, 1998.

S. J. Mullender, G. Van Rossum, A. S. Tanenbaum, R. Van Renesse, and H. Van Staveren, "Amoeba—A Distributed Operating System for the 1990s," IEEE Computer, 23(5):44-53, May 1990.

R. Pike, D. Presotto, S. Dorward, B. Flandrena, K. Thompson, H. Trickey, and P. Winterbottom, "Plan 9 from Bell Labs," Proceedings of the Summer 1990 UKUUG Conference, pp. 1-9, London, UK, Jul. 1990.

J. S. Plank, M. Beck, G. Kingsley, and K. Li, "Libckpt: Transparent Checkpointing under Unix," Proceedings of USENIX Winter 1995 Technical Conference, pp. 213-223, New Orleans, LA, Jan. 1995.

J. Pruyne and M. Livny, "Managing Checkpoints for Parallel Programs," 2nd Workshop on Job Scheduling Strategies for Parallel Processing (in conjunction with IPPS '96), Honolulu, Hawaii, Apr. 1996.

X. Qu, J. X. Yu, and R. P. Brent, "A Mobile TCP Socket," International Conference on Software Engineering (SE '97), San Francisco, CA Nov. 1997.

R. Rashid and G. Robertson, "Accent: A communication oriented network operating system kernel," Proceedings of the 8th Symposium on Operating System Principles, pp. 64-75, Dec. 1984.

T. Richardson, Q. Stafford-Fraser, K. Wood, and A. Hopper, Virtual Network Computing, IEEE Internet Computing, 2(1):33-38, Jan. 1998.

M. Rozier, V. Abrossimov, F. Armand, M. Gien, M. Guillemont, F. Herrman, C. Kaiser, S. Langlois, P. Leonard, and W. Neuhauser, "Overview of the Chorus distributed operating system," 1991.

C. P. Sapuntzakis, R. Chandra, B. Pfaff, J. Chow, M.S. Lam, and M. Rosenblum, Optimizing the Migration of Virtual Computers, Proceedings of the 5th Operating Systems Design and Implementation, Boston, MA, Dec. 2002.

B. K. Schmidt, "Supporting Ubiquitous Computing with Stateless Consoles and Computation Caches," Dissertation, Computer Science Department, Stanford University, Aug. 2000.

A. C. Snoeren and H. Balakrishnan, "An End-to-End Approach to Host Mobility," Proceedings of the 6th ACM/IEEE International Conference on Mobile Computing and Networking (MobiCom '00), Boston, MA, Aug. 2000.

G. Su and J. Nieh, "Mobile Communication with Virtual Network Address Translation," Technical Report CUCS-003-02, Department of Computer Science, Columbia University, Feb. 2002.

Y. Zhang and S. Dao, "A 'Persistent Connection' Model for Mobile and Distributed Systems," 4th International Conference on Computer Communications and Networks (IC-CCN), Las Vegas, NV, Sep. 1995.

H. Zhong and J. Nieh, "CRAK: Linux Checkpoint/Restart as a Kernel Module," Technical Report CUCS-014-01, Department of Computer Science, Columbia University, Nov. 2001.

"How to Break Out of a Chroot Jail," http://www.bpfh.net/simes/computing/chroot-break.html.

Acharya, A., and Raje, M., "MAPbox: Using Parameterized Behavior Classes to Confine Applications," Proceedings of the 2000 USENIX Security Symposium, Aug. 2000.

Andersen, D. G., "Mayday: Distributed Filtering for Internet Services," 4th USENIX Symposium on Internet Technologies and System USITS, Mar. 2003.

Anderson, T. et al., "Preventing Internet Denial-of-Service with Capabilities," Proceedings of the 2nd Workshop on Hot Topics Networks (HotNets-II), Nov. 2003.

Anonymous, "Technical Analysis of 007: Agent Under Fire Save Game Hack." http://www.xbox-linux.org/docs/007analysis.html, Jul. 2003.

Balzer, R., and Goldman, N., "Mediating Connectors: A Non-Bypassable Process Wrapping Technology," Proceedings of the 19th IEEE International Conference on Distributed Computing Systems, Jun. 1999.

Berman, A., et al., "TRON: Process-Specific File Protection for the UNIX Operating System," Proceedings of 1995 USENIX Winter Technical Conference, pp. 165-175, New Orleans, LA, Jan. 1995.

Braden, R. et al., "Resource ReSerVation Protocol (RSVP)—Version 1 Functional Specification," Internet RFC 2208, 1997.

C.E. Perkins and D.B. Johnson, "Mobility Support in IPv6," MOBICOM 96, pp. 27-37, Rye, NY, 1996.

Citrix ICA Technology Brief, Technical White Paper, Boca Research, Boca Raton, FL, 1999.

Collins, M. et al., "An Empirical Analysis of Target-Resident DoS Filters," Proceedings of the IEEE Symposium on Security and Privacy, May 2004.

Cook, D. L. et al., "WebSOS: Protecting Web Servers From DDoS Attacks," Proceedings of the 11th IEEE Conference on Networks (ICON), Sep. 2003, pp. 455-460.

Dasgupta, P., and Boyd, T., "Virtualizing Operating System for Seamless Distributed Environments," IASTED Intl. Conference on Parallel and Distributed Computing and Systems, vol. 2, pp. 735-740, Nov. 2000.

Dean, D. et al., "An Algebraic Approach to IP Traceback," Proceedings of the Symposium on Network and Distributed System Security (SNDSS), Feb. 2001, pp. 3-12.

Dean, D. et al., "Using Client Puzzles to Protect TLS," Proceedings of the 10th USENIX Security Symposium, Aug. 2001.

Delegate. http://www.delegate.org/.

Department of Defense, "Trusted Computer System Evaluation Criteria Orange Book)," Technical Report DoD 5200.28-STD, Dpeartment of Defense, Dec. 1985.

Dierks, T. et al., "The TLS Protocol Version 1.0," RFC 2246, Jan. 1999.

Dingledine, R. et al., "Tor: The Second-Generation Onion Router," Proceedings of the 13th USENIX Security Symposium, Aug. 2004, pp. 303-319.

Fraser, T. et al., "Hardening COTS Software with Generic Software Wrappers," Proceedings of the IEEE Symposium on Security and Privacy, Oakland, CA, May 1999.

FreeBSD Project, Developer's Handbook, http://www.freebsd.org/doc/en_US.ISO8859-1/books.developers-handbook/secure-chroot.html.

Garfinkel, T. et al. "A Virtual Machine Introspection Based Architecture for Intrusion Detection," Proceedings of the 10th Network and Distributed System Security Symposium (NDSS), 191-206, Feb. 2003.

Garfinkel, T. et al., "Ostia: A Delegating Architecture for Secure System Call Interposition," Proceedings of the 11th Network and Distributed System Security Symposium (NDSS), 187-201, Feb. 2004.

Ghormley, D. P., et al., "Slic: An Extensibility System for Commodity Operating Systems," Proceedings of the 1998 USENIX Annual Technical Conference, pp. 39-52, Jun. 1998.

Gligor, V. D., "Guaranteeing Access Spite of Distributed Service-Flooding Attacks," Proceedings of the Security Protocols Workshop, Apr. 2003.

Global Crossing's IP Network Performance. http://www.globalcrossing.com/xml/network/net_ip_performance.xml.

Gobbles Security. "Local/Remote mpg223 Exploit," http://www.opennet.ru/base/exploits/1042565884_668.txt.html.

Goldberg, I., et al., "A Secure Environment for Untrusted Helper Applications," Proceedings of the 1990 USENIX Annual Technical Conference, 1996.

Goodrich, M. T., "Efficient Packet Marking for Large Scale IP Traceback," Proceedings of the 9th ACM Conference on Computer and Communications Security (CSS), Nov. 2002, pp. 117-126.

Hain, T., "Architectural Implications of NAT," RFC2993, IETF, Nov. 2000.

Heberlein, L. et al., "Attack Class: Address Spoofing," Proceedings of the 19th National Information Systems Security Conference, Oct. 1996, pp. 371-377.

Holdrege, M., and Srisuresh, P., "Protocol Complications with the IP Network Address Translator," RFC3027, IETF, Jan. 2001.

http://developer.osdl.org/craiger/hackbench.

httperf. http://www.hpl.hp.com/personal/David_Mosberger/httperf.html.

Hussain, A. et al., "A Framework for Classifying Denial of Service Attacks," Proceedings of ACM SIGCOMM, Aug. 2003, pp. 99-110.

Internet Suspend/Resume Project. http://pittsburgh.intel-research.net/projects/completed/isr.html.

Ioannidis, J. et al., "Implementing Push-Back: Router-Based Defense Against DDoS Attacks," Proceedings of the ISOC Symposium on Network and Distributed System Security (SNDSS), Feb. 2002.

Ioannidis, S., and Bellovin, S., "Sub-Operating Systems: A New Approach to Application Security," Technical Report MS-CIS-01-06, Univ. of Pennsylvania, Feb. 2000.

Jain, K., and Sekal, R., "User-Level Infrastructure for System Call Interposition: A Platform for Intrusion Detection and Confinement," Network and Distributed System Security Symposium, pp. 19-34, San Diego, California, Feb. 2000.

Jin, C. et al., "Hop-Count Filtering: An Effective Defense Against Spoofed DoS Traffic," Proceedings of the 10th ACM International Conference on Computer and Communications Security (CCS), Oct. 2003, pp. 30-41.

Jones, M., "Interposition Agents: Transparently Interposing User Code at the System Interface," 14th ACM Symposium on Operating Systems Principles, Dec. 1993.

Jose Carlos Brustoloni, Protecting Electronic Commerce From Distributed Denial-of-Service Attacks, May 7-11, 2002, ACM, 1-58113-449.

Jul, E., "Migrations of Light-Weight Processes Emerald," IEEE Technical Committee on Operating Systems Newsletter, 3(1):20-23, 1989.

Karger, D. et al., "Consistent Hashing and Random Trees: Distributed Caching Protocols for Relieving Hot Spots on the World Wide Web," Proceedings of the ACM Symposium on Theory of Computing (STOC), May 1997, pp. 654-663.

Kargl, F. et al., "Protecting Web Servers From Distributed Denial of Service Attacks," Proceedings of the W3C World Wide Web Conference (WWW), 2001, pp. 514-524.

Kent, S. et al., "Security Architecture for the Internet Protocol," RFC 2401, Nov. 1998.

Keromytis, A. D. et al., "SOS: An Architecture for Mitigating DDoS Attack," IEEE Journal on Selected Areas of Communications (JSAC), 2003, pp. 413-426, 33(3).

Keromytis, A. D. et al., "SOS: Secure Overlay Services," Proceedings of ACM SIG-COMM, Aug. 2002, pp. 61-72.

Keromytis, A. D. et al., "The Design of the OpenBSD Cryptographic Framework," Proceedings of the USENIX Annual Technical Conference, Jun. 2003, pp. 181-196.

Khattab, S. et al. Proactive Server Roaming for Mitigating Denial-of-Service Attacks, 2003. IEEE, 500-504.

Khattab, S. M. et al., "Roaming Honeypots for Mitigating Service-Level Denial-of-Service Attacks," Proceedings of the 24th International Conference on Distributed Computing Systems (ICDCS), Mar. 2004, pp. 238-337.

Krell, E., and Krishnamurthy, B., "COLA: Customized Overlaying," Proceedings of the USENIX Winter Conference, pp. 3-8, USENIX, Jan. 1992.

Lakshminarayanan, K. et al., "Taming IP Packet Flooding Attacks," Proceedings of the 2nd Workshop on Hot Topics Networks (HotNets-II), Nov. 2003.

Li, J. et al., "Large-Scale IP Traceback High-Speed Internet: Practical Techniques and Theoretical Foundation," Proceedings of IEEE Symposium on Security and Privacy, May 2004.

Linux VServer Project, http://www.linux-vserver.org/.

M. Satyanarayanan, Michael Kozuch, Casey Helfrich, and David R. O'Hallaron, Towards Seamless Mobility on Pervasive Hardware, Pervasive & Mobile Computing, vol. 1, num 2, pp. 157-189, Jun. 2005.

McVoy, L. W., and Staelin, C., "1mbench: Portable Tools for Performance Analysis," USENIX Annual Technical Conference, pp. 279-294, 1996.

Michael A. Kozuch, Casey J. Helfrich, David O'Hallaron, and Mahadev Satyanarayanan, Enterprise Client Management with Internet Suspend/Resume, Intel Technology Journal, vol. 8, num 4, Nov. 17, 2004.

Michael A. Kozuch, Mahadev Satyanarayanan, Thomas Bressoud, Casey J. Helfrich, and Shafeeq Sinnamobideen, Seamless Mobile Computing on Fixed Infrastructure, IEEE Computer, Jul. 2004.

Michael Kozuch and M. Satyanarayanan, Internet Suspend/Resume, Proceedings of the 4th IEEE Workshop on Mobile Computing Systems and Applications, Callicoon, NY, Jun. 2002.

Miltchev, S. et al., "A Study of the Relative Costs of Network Security Protocols," Proceedings of the USENIX Annual Technical Conference, Freenix Track, Jun. 2002, pp. 41-48.

Moore, D. et al., "Inferring Internet Denial-of-Service Activity," Proceedings of the 10th USENIX Security Symposium, Aug. 2001, pp. 9-22.

Morein, W. G. et al., "Using Graphic Turing Tests to Counter Automated DDoS Attacks Against Web Servers," Proceedings of the 10th ACM International Conference on Computer and Communications Security (CCS), Oct. 2003, pp. 8-19.

Mori, G. et al., "Recognizing Objects Adversarial Clutter: Breaking a Visual CAPTCHA," Computer Vision and Pattern Recognition CVPR.

Muthitacharoen, A. et al., "A Low Bandwidth Network File System," Proceedings of the 18th ACM Symposium on Operating Systems Principles, Oct. 2001, pp. 174-187, Chateau Lake Louise, Banff, Canada.

NFS: Network File System Protocol Specification, RFS1094, Sun Microsystems, Inc, Mar. 1989.

Office Action dated Jan. 5, 2011 in U.S. Appl. No. 11/584,312.
Office Action dated Jan. 27, 2012 in U.S. Appl. No. 11/584,451.
Office Action dated Feb. 16, 2010 in U.S. Appl. No. 11/584,314.
Office Action dated Apr. 25, 2011 in U.S. Appl. No. 11/584,314.

Office Action dated May 9, 2011 in U.S. Appl. No. 11/584,451.
Office Action dated Jun. 1, 2009 in U.S. Appl. No. 11/584,314.
Office Action dated Jul. 7, 2011 in U.S. Appl. No. 11/584,312.
Office Action dated Jul. 23, 2010 in U.S. Appl. No. 11/584,312.
Office Action dated Aug. 17, 2010 in U.S. Appl. No. 11/584,314.
Office Action dated Aug. 23, 2010 in U.S. Appl. No. 11/584,451.
Office Action dated Dec. 2, 2009 in U.S. Appl. No. 11/584,312.
Office Action dated Dec. 10, 2009 in U.S. Appl. No. 11/584,451.
Osman, S., D. Subhraveti, Gong Su, and J. Nieh, "The Design and Implementation of Zap: A System for Migrating Computing Environments," Proceedings of the 5th Symposium on Operating Systems Design and Implementation (OSDI 2002), Boston, MA, Dec. 2002. pp. 361-376.
Papadopoulous, C. et al., "COSSACK: Coordinated Suppression of Simultaneous Attacks," Proceedings of DISCEX III, Apr. 2003, pp. 2-13.
Park, K. et al., "On the Effectiveness of Route-Based Packet Filtering for Distributed DoS Attack Prevention Power-Law Internets," Proceedings of ACM SIG-COMM, Aug. 2001, pp. 15-26.
Peterson, L. et al., "A Blueprint for Introducing Disruptive technology Into the Internet," Proceedings of the 1st Workshop on Hot Topics Networks (HotNets-I), Oct. 2002.
Popek, G. J., and Goldberg, R. P., "Formal Requirements for Virtualizable Third Generation Architectures," Commun. ACM, 17(7):412-421, 1974.
Poskanzer, J., http://www.acme.com/software/http_load/.
Potter, S., J. Nieh, D. Subhraveti, "Secure Isolation and Migration of Untrusted Legacy Applications." Columbia University Technical Report CUCS-005-04 (Jan. 2004). pp. 1-6.
Reed, M. et al., "Anonymous Connections and Onion Routing," IEEE Journal on Selected Areas Communications (JSAC), May 1998, pp. 482-494, 16(4).
Reiher, P. et al., "Attacking DDoS at the Source," Proceedings of the 10th IEEE International Conference on Network Protocols, Nov. 2002.
Russell, R., "Linux 2.4 Packet Filtering HOWTO," Linux Netfilter Core Team, Nov. 2001. http://netfilter.samba.org/.
Saltzer, J. H. et al., "End-to-End Arguments System Design" ACM Transactions on Computer Systems, Nov. 1984, pp. 277-288, 2(4).
Satyanarayanan, M. et al., "Coda: A Highly Available File System for Distributed Workstation Environments," IEEE Transactions on Computers, Apr. 1990, 39(4).
Savage, S. et al., "Network Support for IP Traceback," ACM/IEEE Transactions on Networking, Jun. 2001, pp. 226-237, 9(3).
Savage, S. et al., "Practical Network Support for IP Traceback," Proceedings of ACM SIGCOMM, Aug. 2000, pp. 295-306.
Savage, S. et al., "TCP Congestion Control with a Misbehaving Receiver," ACM Computer Communications Review, Oct. 1999, pp. 71-78, 29(5).
Schmidt, B. K., et al., "The Interactive Performance of SLIM: A Stateless, Thin-Client Architecture," 17th ACM Symposium on Operating Systems Principles (SOSP), vol. 34, pp. 32-47, Kiawah island Resort, SC, Dec. 1999.
Schneier, B., "Applied Cryptography," John Wiley and Sons, second edition, 1996.
Schuba, C. et al., "Analysis of a Denial of Service Attack on TCP," Proceedings of the IEEE Symposium on Security and Privacy, May 1997, pp. 208-223.
Senie, D., "Network Address Translator (NAT)-Friendly Application design Guidelines," RFC3235, IETF, Jan. 2002.
SHFS Development Team. SHell File System, SHFS, http://shfs.sourceforge.net.
Snoeren, A. et al., "Hash-Based IP Traceback," Proceedings of ACM SIGCOMM, Aug. 2001.
Softricity, Inc. http://www.softricity.com.
Stavrou, A. et al., "A Lightweight, Robust P2P system to Handle Flash Crowds," IEEE Journal on Selected Areas Communications (JSAC), Jan. 2004, pp. 6-17, 22(1).
Stavrou, A. et al., "A Pay-Per-Use DoS Protection Mechanism for the Web," Proceedings of the Applied Cryptography and Network Security (ACNS) Conference, Jun. 2004, pp. 120-134.
Stoica, I. et al., "Chord: A Scalable Peer-to-Peer Lookup Service for Internet Application," Proceedings of ACM SIGCOMM, Aug. 2001.
Stone, R. et al., "CenterTrack: An IP Overlay Network for Tracking DoS Floods," Proceedings of the USENIX Security Symposium, Aug. 2000.
SWsoft. "Virtuozzo—The Complete Server Automation and Virtualization Solution." http://www.sw-soft.com/products/virtuozzo.
Tennenhouse, D. L. et al., "A Survey of Active Network Research," IEEE Communications Magazine, Jan. 1997, pp. 80-86.
The Volano Report Volano LLC, Dec. 2001. http://www.volano.com/report.
Thomas, R. et al., "Net-Bouncer: Client-Legitimacy-Based High-Performance DDoS Filtering," Proceedings of DISCEX III, Apr. 2003, pp. 14-25.
TPC-W Java Implementation. http://mitglied.lycos.de/jankiefer/tpcw/.
Trusted Computing Platform Alliance. TCPA Main Specification v1.1b. http://www.trustedcomputing.org.
U.S. Appl. No. 11/584,451, filed Oct. 20, 2006.
U.S. Appl. No. 11/584,312, filed Oct. 20, 2006.
U.S. Appl. No. 60/729,093, filed Oct. 20, 2005.
U.S. Appl. No. 11/584,314, filed Oct. 20, 2006.
U.S. Appl. No. 60/729,095, filed Oct. 20, 2005.
U.S. Appl. No. 60/729,094, filed Oct. 20, 2005.
U.S. Appl. No. 60/729,096, filed Oct. 20, 2005.
U.S. Appl. No. 60/729,116, filed Oct. 20, 2005.
USENIX. Proceedings of the 3rd Virtual Machine Research and Technology Symposium, May 6-7, 2004, San Jose, CA, USA, May 2004.
Using the RDTSC Instruction for Performance Monitoring, Pentium II Processor Application Notes, Intel Corporation, 1997.
Vixie, P. et al., "Dynamic Updates the Domain Name System (DNS Update)," RFC2136, IETF, Apr. 1997.
VMware VirtualCenter. http://www.vmware.com/products/vmanage/.
VMware, Inc. http://www.vmware.com.
Von Ahn, L. et al., "CAPTCHA: Using Hard AI Problems for Security," Proceedings of EUROCRYPT, 2003.
Wang, X. et al., "Defending Against Denial-of-Service Attacks with Puzzle Auctions (Extended Abstract)," Proceedings of the IEEE Symposium on Security and Privacy, May 2003.
Xuan, D. et al., "Analyzing the Secure Overlay Service Architecture Under Intelligent DDoS Attacks," Proceedings of the 24th International Conference on Distributed Computing Systems (ICDCS), Mar. 2004, pp. 408-417.
Yaar, A. et al., "Pi: A Path Identification Mechanism to Defend Against DDoS Attacks," Proceedings of the IEEE Symposium on Security and Privacy, May 2003.
Yaar, A. et al., "SIFF: A Stateless Internet Flow Filter to Mitigate DDoS Flooding Attacks," Proceedings of the IEEE Symposium on Security and Privacy, May 2004.
Zandy, V. C., and Miller, B. P., "reliable Network Connections," Proceedings of 8th ACM International Conference on Mobile Computing and Networking (MobiCom '02), Atlanta, GA, Sep. 2002.
A. Agbaria et al., "Starfish: Fault-tolerant Dynamic Programs on Clusters of Workstations," In Proceedings of the 8th IEEE International Symposium on High Performance Distributed Computing, 1999.
D. Bailey et al., "The NAS Parallel Benchmarks," The International Journal of Supercomputer Applications, 5 (3):63-73, Fall 1991.
S. Balay et al., "PETSc 2.0 User's Manual," Technical Report ANL-95/11—Revision 2.0.29, 2000.
R. Baratto et al., "MobiDesk: Mobile Virtual Desktop Computing," In Proceeding of the Tenth Annual ACM International Conference on Mobile Computing and Networking (MobiCom 2004), pp. 1-15, Oct. 2004.
A. Beguelin et al., "Application Level Fault Tolerance in Heterogeneous Networks of Workstations," Journal of Parallel and Distributed Computing, 43(2):147-155, Jun. 1997.
G. Bronevetsky et al., "C3: A System for Automating Application-Level Checkpointing of MPI Programs," In Proceedings of the 16th International Workshop on Languages and Compilers for Parallel Computers (LCPC '03), Oct. 2003.

J. Casas et al., "MPVM: A migration transparent version of PVM," Computing Systems, 8(2):171-216, 1995.

K. Chandy et al., "Distributed Snapshots: Determining Global States of Distributed Systems," ACM Transactions on Computer Systems, 3(1):63-75, Feb. 1985.

Y. Chen et al., "CLIP—Checkpointing Tool for Message-Passing Parallel Programs," In Proceedings of the Supercomputing, Nov. 1997.

J. Duell et al., The Design and Implementation of Berkeley Lab's Linux Checkpoint/Restart, Technical Report, Lawrence Berkeley National Laboratory, 2002.

G. Fagg et al., "FT-MPI: Fault Tolerant MPI, Supporting Dynamic Applications in a Dynamic World," In LNCS: Proceedings of the 7th European PVM/MPI Users' Group Meeting, vol. 1908, pp. 346-353, 2000.

W. Gropp, "MPICH2: A New Start for MPI Implementations," In LNCS: Proceedings of the 9th European PVM/MPI Users' Group Meeting on Recent Advances in Parallel Virtual Machine and Message Passing Interface, vol. 2474, p. 7, 2002.

C. Wright et al., "Versatility and Unix Semantics in a Fan-Out Unification File System," Technical Report, Stony Brook University, FSL-04-01b, Jan. 2004.

Y. Huang et al., "Software Tools and Libraries for Fault Tolerance," IEEE Technical Committee on Operating System and Application Environments, 7(4):5-9, 1995.

J. Janakiraman et al., "Cruz: Application-Transparent Distributed Checkpoint-Restart on Standard Operating Systems," In Proceedings of the International Conference on Dependable Systems and Networks (DSN '05), Jun. 2005.

C. Landau, "The Checkpoint Mechanism in KeyKOS," In Proceedings of the 2nd International Workshop on Object Orientation in Operating Systems, pp. 86-91, Sep. 1992.

J. Plank, "An Overview of Checkpointing in Uniprocessor and Distributed Systems, Focusing on Implementation and Performance," Technical Report UT-CS-97-372, Department of Computer Science, University of Tennessee, Jul. 1997.

E. Roman, "A Survey of Checkpoint/Restart Implementations," Technical Report, Lawrence Berkeley National Laboratory, 2002.

J. Sancho et al., "Current Practice and a Direction Forward in Checkpoint/Restart Implementations for Fault Tolerance," In Proceedings of the 19th IEEE International Parallel and Distributed Processing Symposium (IPDPS '05), Apr. 2005.

S. Sankaran et al., "LAM/MPI Checkpoint/Restart Framework: System-Initiated Checkpointing," In Proceedings of the LACSI Symposium, Oct. 2003.

S. Soltis et al., "The Global File System," In Proceedings of the Fifth NASA Goddard Conference on Mass Storage Systems, pp. 319-342, 1996.

G. Su, "MOVE: Mobility with Persistent Network Connections," Department of Computer Science, Columbia University, Oct. 2004.

T. Takahashi et al., "PM2: High Performance Communication Middleware for Heterogeneous Network Environments," In Proceedings of the IEEE/ACM SC2000 Conference, Nov. 2000.

T. Tannenbaum et al., "The Condor Distributed Processing System," Dr. Dobb's Journal, 227:40-48, Feb. 1995.

H. Zhong et al., "CRAK: Linux Checkpoint/Restart as a Kernel Module," Technical Report CUCS-014-01, Department of Computer Science, Columbia University, Nov. 2001.

Office Action dated Apr. 3, 2012 in U.S. Appl. No. 11/584,312.

Artsy, Y. et al., "Interprocess Communication Charlotte," IEEE Software, pp. 22-28, Jan. 1987.

Bell, D. and LaPadula, L., "Secure Computer Systems: Mathematical Foundations and Model", Technical Report ESD-TR-74-244, Mitre Corp, Bedford, MA, May 1973.

Biba, K., "Integrity Considerations for Secure Computer Systems," Technical Report ESD-TR-76-372, Mitre Corp, Bedford, MA, 1977.

Karger, P. A., and Schell, R. R., "Multics Security Evaluation: Vulnerability Analysis," Technical Report ESD-TR-74-193, Mitre Corp, Bedford, MA, Jun. 1974.

Ccitt, "X.509: The Directory Authentication Framework", International Telecommunications Union, 1988, Geneva.

Blackert, W.J., et al., "Analyzing Interaction Between Distributed Denial of Service Attacks and Mitigation Technologies", In Proceedings of DARPA Information Survivability Conference and Exposition (DISCEX III), vol. 1, Apr. 22-24, 2003, pp. 26-36.

Goldberg, R., et al., "Architectural Principles for Virtual Computer Systems", Harrvard University, Feb. 1973, pp. 1-229, available at: http://www.dtic.mil/cgi-bin/GetTRDoc?AD=AD772809 &Location=U2&doc=GetTRDoc.pdf.

Office Action dated Aug. 1, 2012 in U.S. Appl. No. 11/584,451.

Smith, J.E. and Nari, R., "Virtual Machines: Versatile Platforms for Systems and Processes", Morgan Kaufmann Publishers, Jun. 3, 2005, pp. 1-638.

* cited by examiner

METHODS, MEDIA AND SYSTEMS FOR MANAGING A DISTRIBUTED APPLICATION RUNNING IN A PLURALITY OF DIGITAL PROCESSING DEVICES

CROSS-REFERENCE TO RELATED APPLICATIONS

This application claims priority under 35 U.S.C. §119(e) from U.S. Provisional Application No. 60/729,094, filed on Oct. 20, 2005, U.S. Provisional Application No. 60/729,093, filed on Oct. 20, 2005, and U.S. Provisional Application No. 60/729,096, filed on Oct. 20, 2005, which are hereby incorporated by reference in their entireties.

STATEMENT REGARDING FEDERALLY SPONSORED RESEARCH OR DEVELOPMENT

The government may have certain rights in the present invention pursuant to grants by National Science Foundation, grant numbers ANI-0240525 and CNS-0426623, and Department of Energy Early Career Award.

TECHNOLOGY AREA

The disclosed subject matter relates to methods, media and systems for managing a distributed application running in a plurality of digital processing devices.

BACKGROUND

As computers have become faster, cheaper, they have become ubiquitous in academic, corporate, and government organizations. At the same time, the widespread use of computers has given rise to enormous management complexity and security hazards, and the total cost of owning and maintaining them is becoming unmanageable. The fact that computers are increasingly networked complicates the management problem.

One difficult problem relates to managing systems where applications (e.g., resource-intensive scientific applications) are distributed to run on multiple nodes in a computer cluster. In these systems, when a cluster node goes down for maintenance or because of a fault condition, it is desirable that the distributed applications can continue to run in the cluster when at least one cluster node is still operational. This calls for an application checkpoint-restart function, which is the ability to save a running application at a given point in time such that it can be restored at a later time in the same state in which it was saved. Application checkpoint-restart can facilitate fault resilience by migrating applications off faulty cluster nodes and fault recovery by restarting applications from a previously saved state. However, conventional checkpoint-restart mechanisms cannot provide this functionality, while ensuring the global consistency of the network state of the cluster nodes, transparently on clusters running commodity operating systems and hardware.

SUMMARY

Methods, media and systems for managing a distributed application running in a plurality of digital processing devices are provided. In some embodiments, methods for managing a distributed application running in a plurality of digital processing devices are provided, comprising: running one or more processes associated with the distributed application in virtualized operating system environments in a plurality of digital processing devices; suspending the one or more processes; saving network state information relating to network connections among the one or more processes; storing process information relating to the one or more processes; recreating the network connections using the saved network state information; and restarting the one or more processes using the stored process information.

In some embodiments, computer-readable media containing computer-executable instructions that, when executed by a processor, cause the processor to perform a method for managing a distributed application running in a plurality of digital processing devices are provided, the method comprising: running one or more processes associated with the distributed application in virtualized operating system environments in a plurality of digital processing devices; suspending the one or more processes; saving network state information relating to network connections among the one or more processes; storing process information relating to the one or more processes; recreating the network connections using the saved network state information; and restarting the one or more processes using the stored process information.

In some embodiments, systems for managing a distributed application are provided, comprising: a plurality of interconnected digital processing devices configured to run one or more processes associated with the distributed application in virtualized operating system environments, suspend the one or more processes, save network state information relating to network connections among the one or more processes, recreate the network connections using the saved network state information, and restart the one or more processes using the stored process information.

BRIEF DESCRIPTION OF THE DRAWINGS

The Detailed Description, including the description of various embodiments of the invention, will be best understood when read in reference to the accompanying figures wherein.

DETAILED DESCRIPTION

Methods, media and systems for managing a distributed application running in a plurality of digital processing devices (e.g., computers) are provided. In some embodiments, methods, media, and systems are provided for transparent coordinated checkpoint-restart of distributed network applications on commodity clusters. To this end, a virtualized operating system environment can be used to migrate applications in a flexible manner.

Figure 1:
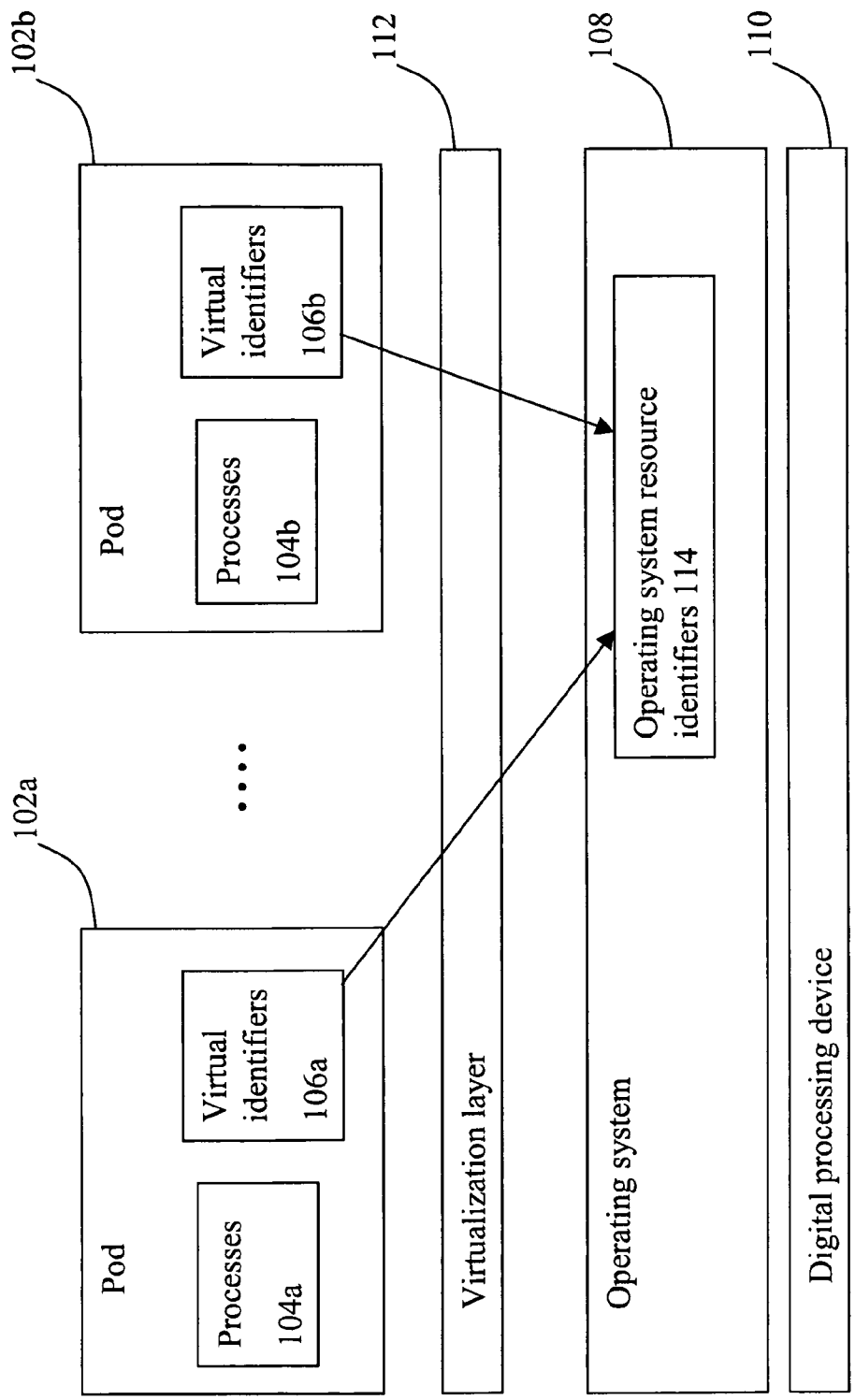
FIG. 1 is a block diagram illustrating an operating system virtualization scheme according to some embodiments.

FIG. 1 is a block diagram illustrating an operating system virtualization scheme in some embodiments. An operating system 108 that runs on digital processing device 110 can be provided with a virtualization layer 112 that provides a Process Domain (pod) abstraction. Digital processing device 110 can include, for example, computers, set-top boxes, mobile computing devices such as cell phones and Personal Digital Assistants (PDAs), other embedded systems and/or any other suitable device. One or more pods, for example, Pod 102a and Pod 102b, can be supported. A pod (e.g., pod 102a) can include a group of processes (e.g., processes 104a) with a private namespace, which can include a group of virtual identifiers (e.g., identifiers 106a). The private namespace can present the process group with a virtualized view of the operating system 108. This virtualization provided by virtualization layer 112 can associate virtual identifiers (e.g., identifiers 106a) with operating system resources identifiers 114 such as process identifiers and network addresses. Hence, processes (e.g., processes 104a) in a pod (e.g., pod 102a) can be decoupled from dependencies on the operating system 108 and from other processes (e.g., processes 104b) in the system. This virtualization can be integrated with a checkpoint-restart mechanism that enables processes within a pod to be migrated as a unit to another machine. This virtualization scheme can be implemented to virtualize any suitable operating systems, including, but not limited to, Unix, Linux, and Windows operating systems. This virtualization scheme can be, for example, implemented as a loadable kernel module in Linux.

The private, virtual namespace of pods enables secure isolation of applications by providing complete mediation to operating system resources. Pods can restrict what operating system resources are accessible within a pod by simply not providing identifiers to such resources within its namespace. A pod only needs to provide access to resources that are needed for running those processes within the pod. It does not need to provide access to all resources to support a complete operating system environment. An administrator can configure a pod in the same way one configures and installs applications on a regular machine. Pods enforce secure isolation to prevent exploited pods from being used to attack the underlying host or other pods on the system. Similarly, the secure isolation allows one to run multiple pods from different organizations, with different sets of users and administrators on a single host, while retaining the semantic of multiple distinct and individually managed machines.

For example, to provide a web server, a web server pod can be setup to only contain the files the web server needs to run and the content it wants to serve. The web server pod could have its own IP address, decoupling its network presence from the underlying system. The pod can have its network access limited to client-initiated connections using firewall software to restrict connections to the pod's IP address to only the ports served by applications running within this pod. If the web server application is compromised, the pod limits the ability of an attacker to further harm the system because the only resources he has access to are the ones explicitly needed by the service. The attacker cannot use the pod to directly initiate connections to other systems to attack them since the pod is limited to client-initiated connections. Furthermore, there is no need to carefully disable other network services commonly enabled by the operating system to protect against the compromised pod because those services, and the core operating system itself, reside outside of the pod's context.

Pod virtualization can be provided using a system call interposition mechanism and the chroot utility with file system stacking. Each pod can be provided with its own file system namespace that can be separate from the regular host file system. While chroot can give a set of processes a virtualized file system namespace, there may be ways to break out of the environment changed by the chroot utility, especially if the chroot system call is allowed to be used by processes in a pod. Pod file system virtualization can enforce the environment changed by the chroot utility and ensure that the pod's file system is only accessible to processes within the given pod by using a simple form of file system stacking to implement a barrier. File systems can provide a permission function that determines if a process can access a file.

For example, if a process tries to access a file a few directories below the current directory, the permission function is called on each directory as well as the file itself in order. If any of the calls determine that the process does not have permission on a directory, the chain of calls ends. Even if the permission function determines that the process has access to the file itself, it must have permission to traverse the directory hierarchy to the file to access it. Therefore, a barrier can be implemented by stacking a small pod-aware file system on top of the staging directory that overloads the underlying permission function to prevent processes running within the pod from accessing the parent directory of the staging directory, and to prevent processes running only on the host from accessing the staging directory. This effectively confines a process in a pod to the pod's file system by preventing it from ever walking past the pod's file system root.

Any suitable network file system, including Network File System (NFS), can be used with pods to support migration. Pods can take advantage of the user identifier (UID) security model in NFS to support multiple security domains on the same system running on the same operating system kernel. For example, since each pod can have its own private file system, each pod can have its own /etc/passwd file that determines its list of users and their corresponding UIDs. In NFS, the UID of a process determines what permissions it has in accessing a file.

Pod virtualization can keep process UIDs consistent across migration and keep process UIDs the same in the pod and operating system namespaces. However, because the pod file system is separate from the host file system, a process running in the pod is effectively running in a separate security domain from another process with the same UID that is running directly on the host system. Although both processes have the same UID, each process is only allowed to access files in its own file system namespace. Similarly, multiple pods can have processes running on the same system with the same UID, but each pod effectively provides a separate security domain since the pod file systems are separate from one another. The pod UID model supports an easy-to-use migration model when a user may be using a pod on a host in one administrative domain and then moves the pod to another. Even if the user has computer accounts in both administrative domains, it is unlikely that the user will have the same UID in both domains if they are administratively separate. Nevertheless, pods can enable the user to run the same pod with access to the same files in both domains.

Suppose the user has UID 100 on a machine in administrative domain A and starts a pod connecting to a file server residing in domain A. Suppose that all pod processes are then running with UID 100. When the user moves to a machine in administrative domain B where he has UID 200, he can migrate his pod to the new machine and continue running processes in the pod. Those processes can continue to run as UID 100 and continue to access the same set of files on the pod file server, even though the user's real UID has changed. This works, even if there's a regular user on the new machine with a UID of 100. While this example considers the case of having a pod with all processes running with the same UID, it is easy to see that the pod model supports pods that may have running processes with many different UIDs.

Because the root UID 0 may be privileged and treated specially by the operating system kernel, pod virtualization may treat UID 0 processes inside of a pod specially as well. This can prevent processes running with privilege from breaking the pod abstraction, accessing resources outside of the pod, and causing harm to the host system. While a pod can be configured for administrative reasons to allow full privileged access to the underlying system, there are pods for running application services that do not need to be used in this manner. Pods can provide restrictions on UID 0 processes to ensure that they function correctly inside of pods.

When a process is running in user space, its UID does not have any affect on process execution. Its UID only matters when it tries to access the underlying kernel via one of the kernel entry points, namely devices and system calls. Since a pod can already provide a virtual file system that includes a virtual/dev with a limited set of secure devices, the device entry point may already be secure. System calls of concern include those that could allow a root process to break the pod abstraction. They can be classified into three categories and are listed below:

Category 1: Host Only System Calls mount—If a user within a pod is able to mount a file system, they could mount a file system with device nodes already present and thus would be able to access the underlying system directly. Therefore, pod processes may be prevented from using this system call.

stime, adjtimex—These system calls enable a privileged process to adjust the host's clock. If a user within a pod could call this system call they can cause a change on the host. Therefore pod processes may be prevented from using this system call.

acct—This system call sets what file on the host BSD process accounting information should be written to. As this is host specific functionality, processes may be prevented from using this system call.

swapon, swapoff—These system calls control swap space allocation. Since these system calls are host specific and may have no use within a pod, processes may be prevented from calling these system calls.

reboot—This system call can cause the system to reboot or change Ctrl-Alt-Delete functionality. Therefore, processes may be prevented from calling it.

ioperm, iopl—These system calls may enable a privileged process to gain direct access to underlying hardware resources. Since pod processes do not access hardware directly, processes may be prevented from making these system calls.

create_nodule, init_nodule, delete_nodule, query_module—These system calls relate to inserting and removing kernel modules. As this is a host specific function, processes may be prevented from making these system calls.

sethostname, setdomainname—These system call set the name for the underlying host. These system calls may be wrapped to save them with pod specific names, allowing each pod to call them independently.

nfsservctl—This system call can enable a privileged process inside a pod to change the host's internal NFS server. Processes may be prevented from making this system call.

Category 2: Root Squashed System Calls nice, setpriority, sched_setscheduler—These system calls lets a process change its priority. If a process is running as root (UID 0), it can increase its priority and freeze out other processes on the system. Therefore, processes may be prevented from increasing their priorities.

ioctl—This system call is a syscall demultiplexer that enables kernel device drivers and subsystems to add their own functions that can be called from user space. However, as functionality can be exposed that enables root to access the underlying host, all system call beyond a limited audited safe set may be squashed to user "nobody," similar to what NFS does.

setrlimit—this system call enables processes running as UID 0 to raise their resource limits beyond what was preset, thereby enabling them to disrupt other processes on the system by using too much resources. Processes may be prevented from using this system call to increase the resources available to them.

mlock, mlockall—These system calls enable a privileged process to pin an arbitrary amount of memory, thereby enabling a pod process to lock all of available memory and starve all the other processes on the host. Privileged processes may therefore be reduced to user "nobody" when they attempt to call this system call so that they are treated like a regular process.

Category 3: Option Checked System Calls mknod—This system call enables a privileged user to make special files, such as pipes, sockets and devices as well as regular files. Since a privileged process needs to make use of such functionality, the system call cannot be disabled. However, if the process creates a device it may be creating an access point to the underlying host system. Therefore when a pod process makes use of this system call, the options may be checked to prevent it from creating a device special file, while allowing the other types through unimpeded.

The first class of system calls are those that only affect the host system and serve no purpose within a pod. Examples of these system calls include those that load and unload kernel modules or that reboot the host system. Because these system calls only affect the host, they would break the pod security abstraction by allowing processes within it to make system administrative changes to the host. System calls that are part of this class may therefore be made inaccessible by default to processes running within a pod.

The second class of system calls are those that are forced to run unprivileged. Just like NFS, pod virtualization may force privileged processes to act as the "nobody" user when they want to make use of some system calls. Examples of these system calls include those that set resource limits and ioctl system calls. Since system calls such as setrlimit and nice can allow a privileged process to increase its resource limits beyond predefined limits imposed on pod processes, privileged processes are by default treated as unprivileged when executing these system calls within a pod. Similarly, the ioctl system call is a system call multiplexer that allows any driver on the host to effectively install its own set of system calls. Pod virtualization may conservatively treat access to this system call as unprivileged by default.

The third class of system calls are calls that are required for regular applications to run, but have options that will give the processes access to underlying host resources, breaking the pod abstraction. Since these system calls are required by applications, the pod may check all their options to ensure that they are limited to resources that the pod has access to, making sure they are not used in a manner that breaks the pod abstraction. For example, the mknod system call can be used by privileged processes to make named pipes or files in certain application services. It is therefore desirable to make it available for use within a pod. However, it can also be used to create device nodes that provide access to the underlying host resources. To limit how the system call is used, the pod system call interposition mechanism may check the options of the system call and only allows it to continue if it is not trying to create a device.

Figure 2:
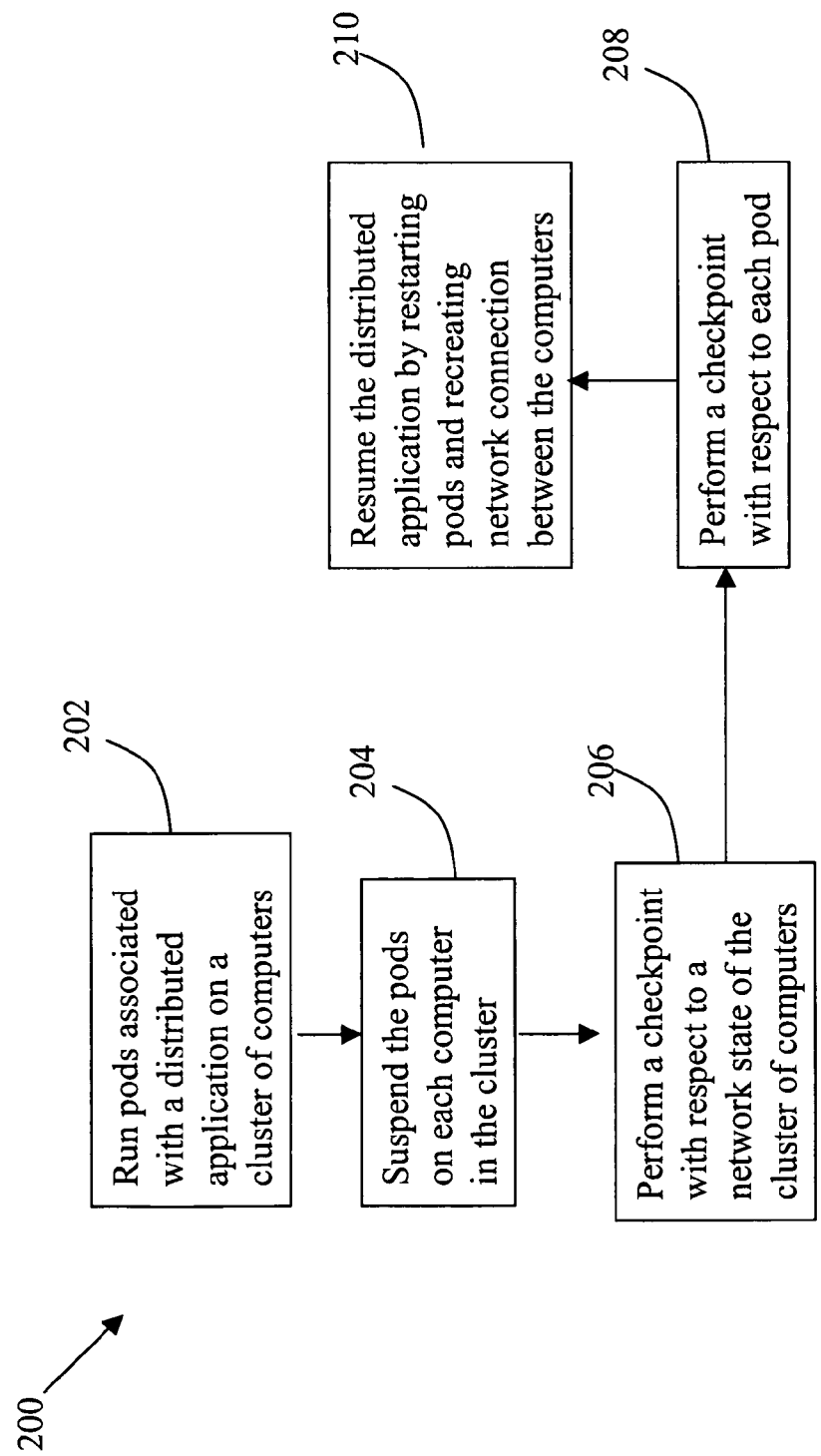
FIG. 2 is a diagram illustrating a method for managing a distributed application, according to some embodiments.

In some embodiments, checkpoint-restart as shown in FIG. 2 can allow pods to be migrated across machines running different operating system kernels. Upon completion of the upgrade process (e.g., at 210 of method 200), the system and its applications may be restored on the original machine. Pods can be migrated between machines with a common CPU architecture with kernel differences that may be limited to maintenance and security patches.

Many of the Linux kernel patches contain security vulnerability fixes, which are typically not separated out from other maintenance patches. Migration can be achieved where the application's execution semantics, such as how threads are implemented and how dynamic linking is done, do not change. On the Linux kernels, this is not an issue as all these semantics are enforced by user-space libraries. Whether one uses kernel or user threads, or how libraries are dynamically linked into a process can be determined by the respective libraries on the file system. Since the pod may have access to the same file system on whatever machine it is running on, these semantics can stay the same. To support migration across different kernels, a system can use a checkpoint-restart mechanism that employs an intermediate format to represent the state that needs to be saved on checkpoint, as discussed above.

In some embodiments, the checkpoint-restart mechanism can be structured to perform its operations when processes are in such a state that saving on checkpoint can avoid depending on many low-level kernel details. For example, semaphores typically have two kinds of state associated with each of them: the value of the semaphore and the wait queue of processes waiting to acquire the corresponding semaphore lock. In general, both of these pieces of information have to be saved and restored to accurately reconstruct the semaphore state. Semaphore values can be easily obtained and restored through GETALL and SETALL parameters of the semctl system call. But saving and restoring the wait queues involves manipulating kernel internals directly. The checkpoint-restart mechanism avoids having to save the wait queue information by requiring that all the processes be stopped before taking the checkpoint. When a process waiting on a semaphore receives a stop signal, the kernel immediately releases the process from the wait queue and returns EINTR. This ensures that the semaphore wait queues are always empty at the time of checkpoint so that they do not have to be saved.

While most process state information can be abstracted and manipulated in higher-level terms using higher-level kernel services, there are some parts that are not amenable to a portable intermediate representation. For instance, specific TCP connection states like time-stamp values and sequence numbers, which do not have a high-level semantic value, have to be saved and restored to maintain a TCP connection. As this internal representation can change, its state needs to be tracked across kernel versions and security patches. Fortunately, there is usually an easy way to interpret such changes across different kernels because networking standards such as TCP do not change often. Across all of the Linux 2.4 kernels, there was only one change in TCP state that required even a small modification in the migration mechanism. Specifically, in the Linux 2.4.14 kernel, an extra field was added to TCP connection state to address a flaw in the existing syncookie mechanism. If configured into the kernel, syncookies protect an Internet server against a synflood attack. When migrating from an earlier kernel to a Linux-2.4.14 or later version kernel, the extra field can be initialized in such a way that the integrity of the connection is maintained. In fact, this is the only instance across all of the Linux 2.4 kernel versions where an intermediate representation is not possible and the internal state had changed and had to be accounted for.

By providing a thin virtualization layer on top of an operating system, a distributed application can be decoupled from operating system instances running on a set of cluster nodes. This frees the application from dependencies on the cluster nodes on which it is executing. This virtualization may expose the underlying host operating system functionality directly to applications, enabling parallel applications to efficiently utilize existing multiprocessor operating system functionality. The cluster nodes in a cluster can run independent commodity operating system instances, and the nodes can have access to a shared storage infrastructure. For example, a common configuration may be a set of blade servers or rack-mounted 1U servers running standard Linux and connected to a common Storage Area Network (SAN) or a Network Attached Storage (NAS) storage infrastructure.

FIG. 2 is a diagram illustrating a method 200 for managing a distributed application, according to some embodiments. At 202, a number of pods associated with a distributed application run in a computer cluster. At 204, the pods are suspended. At 206, a checkpoint is performed with respect to a network state by saving information regarding the network connections between the computers in the cluster. At 208, a checkpoint is performed with respect to the pods on the computers. At 210, the pods and the network connections are recreated in the cluster, where the location of pods may have changed.

In method 200, according to some embodiments, an entire distributed application can be saved on checkpoint across all nodes in a coordinated manner so that it can be restarted at the checkpoint on a different set of cluster nodes at a later time. In saving and restarting a distributed application, the processing of a network state can be separated from per node application states. Operation in saving the network state can be synchronized. Checkpoint-restart operations on per node application states can be designed to proceed in parallel with minimal synchronization requirements among nodes, resulting in faster checkpoint-restart times. In some embodiments, checkpoint data can be directly streamed from one set of nodes to another, enabling direct migration of a distributed application to a new set of nodes without saving and restoring state from secondary storage.

In some embodiments, complete checkpoint-restart of network state can be supported in a transport protocol independent manner without application or library support. Socket abstraction can be used to save and restore all socket state, including socket parameters, socket data queues, and minimal protocol specific state. This can be accomplished in a portable manner using the standard socket interface without detailed knowledge of the underlying network protocol data structures. In some embodiments, network state can be saved and restored in a protocol independent manner for reliable and unreliable network protocols, including TCP, UDP and raw DP.

A system or a computer software product for checkpoint-restart of distributed applications can include three logical components: a standalone pod checkpoint-restart mechanism that saves and restores non-network per-node application state, a manager that coordinates a set of agents each using the standalone checkpoint-restart mechanism to save and restore a distributed application across a set of cluster nodes in a consistent manner, and a network checkpoint-restart mechanism that saves and restores all the necessary network state to enable the application processes running on different nodes to communicate.

The pod checkpoint-restart mechanism can use the pod virtual machine abstraction. Pod virtual resources are transparently mapped-to real operating system resources as a pod migrates from one node to another. This allows distributed applications to migrate to any cluster regardless of its IP subnet or addresses. Pod namespaces can be supported using a thin virtualization layer based on system call interposition mechanism and the chroot utility with file system stacking. The pod virtualization layer can be implemented entirely in a dynamically loadable kernel module.

In some embodiments, the pod checkpoint-restart mechanism can employ higher-level semantic information specified in an intermediate format rather than kernel specific data in native format to keep the format portable across different kernels. In some embodiments, the pod checkpoint-restart mechanism assumes a shared storage infrastructure across cluster nodes and does not save and restore file system state as part of the pod checkpoint image to reduce checkpoint image size. In these embodiments, the mechanism can be used with already available file system snapshot functionality to provide a saved file system image.

Using some embodiments, a distributed application can be executed in a manner that is analogous to a regular cluster. Each application endpoint (process) can be placed in a separate pod. On multiprocessor nodes that run multiple application endpoints, each endpoint can be encapsulated in a separate pod. To leverage mobility, the application can be divided into many independent pods. This allows for maximum flexibility when migrating the application. A distributed application running on N cluster nodes can be moved to run on M cluster nodes, where N may or may not be equal to M. For instance, a dual-CPU node may host two application endpoints encapsulated in two separate pods. Each pod can thereafter be relocated to a distinct node; they do not need to be migrated together to the same node.

A coordinated checkpoint-restart scheme can include a Manager client that orchestrates the operation of a set of Agents, one on each node. The Manager is the front-end client invoked by the user and can be run from anywhere, inside or outside the cluster. It accepts a user's checkpoint or restart request and translates it into a set of commands to the Agents. The Agents receive these commands and carry them out on their local nodes.

The Manager can maintain reliable network connections with the Agents throughout the entire operation. Therefore an Agent failure can be readily detected by the Manager as soon as the connection becomes broken. Similarly, the Agents can detect a failure of the Manager. In both cases, the operation can be gracefully aborted, and the application can resume its execution.

A checkpoint can be initiated by invoking the Manager with a list of tuples of the form <node, pod, URI>. This list specifies the nodes and the pods that compose the distributed application, as well as the destination for the saved data (URI). The destination can be either a file name or a network address of a receiving Agent. This facilitates direct migration of an application from one set of nodes to another without requiring that the checkpoint data first be written to some intermediary storage.

Figure 3:
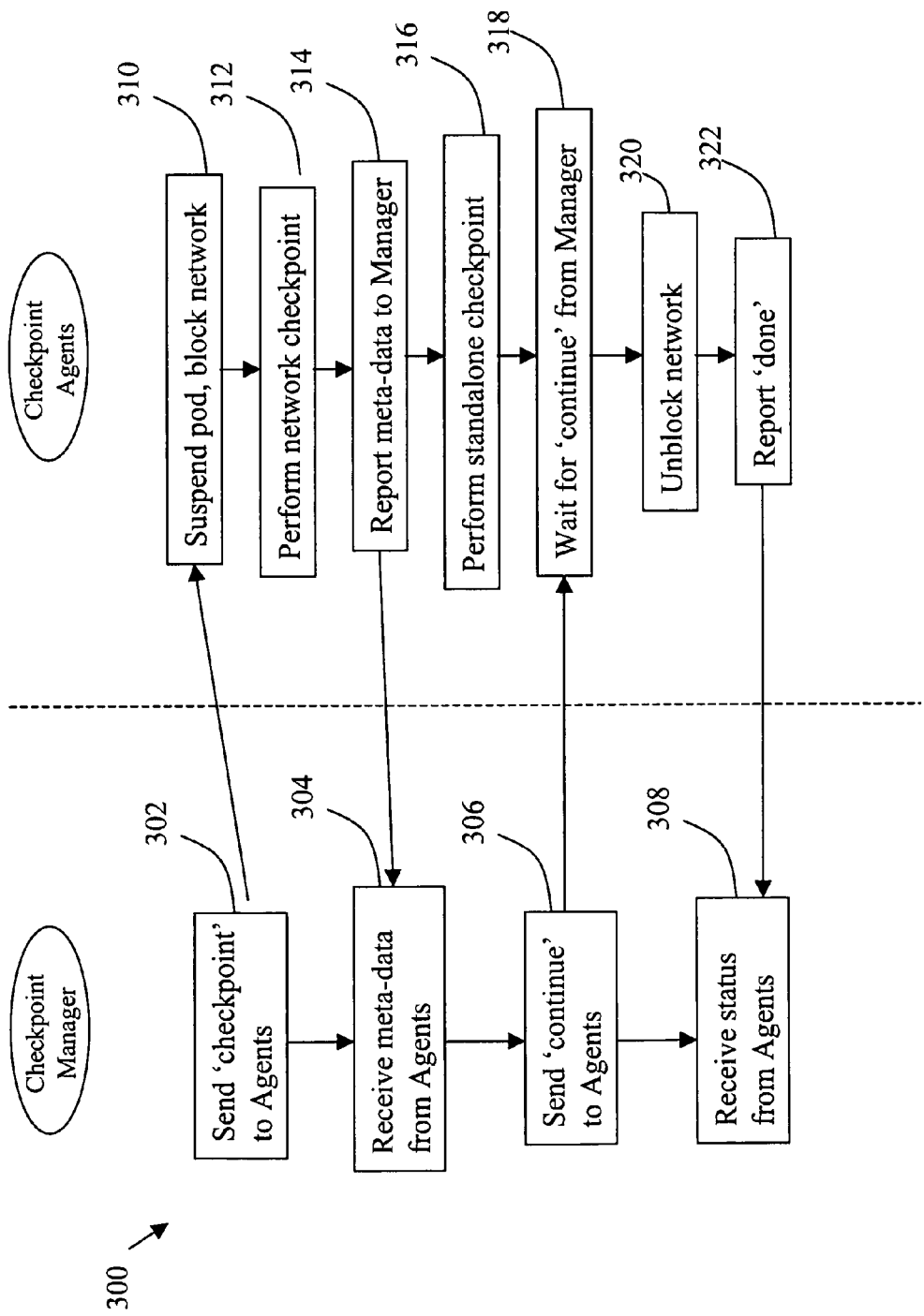
FIG. 3 is a diagram illustrating a method for performing a checkpoint of a distributed application, according to some embodiments.

FIG. 3 is a diagram illustrating a method 300 of some embodiments for performing a checkpoint of a distributed application, to be performed by the Manager and the Agents. Given a checkpoint request, the Manager can begin with broadcasting a checkpoint command to all participating nodes at 302. Upon receiving the command, each Agent can initiate the local checkpoint procedure as follows. The Agent can suspend the designated pod at 310, invoke the network-state checkpoint at 312, and report meta-data to the Manager at 314. The Agent can then proceed with the standalone pod checkpoint at 316, and wait for a 'continue' message from the Manager at 318. The Manager, after receiving meta-data at 304 from all Agents, can send a 'continue' message to the Agents at 306. The Agent can then unblock the network at 320 and report 'done' to the Manager at 322. This ensures that the Agents finish only after having received the 'continue' message from the Manager and reported 'done.'

Each Agent can first suspend its respective pod at 310 by sending a SIGSTOP signal to all the processes in the pod to prevent those processes from being altered during checkpoint. To prevent the network state from changing, the Agent can disable all network activity to and from the pod. This can be achieved by using a standard network filtering service (e.g., Netfilter in Linux) to block the network links. The Agent can then obtain the network meta-data of the node, a table of <state, source, target> tuples showing all network connections of the pod. This can be the first information saved by the Agent as part of the checkpoint and can be used by the restart procedure to correctly reconstruct the network state. The source and target fields describe the connection endpoint IP addresses and port numbers. The state field reflects the state of the connection, which may be full-duplex, half-duplex, closed (in which case there may still be unread data), or connecting. The first three states are for established connections while the last state is a transient state for a not yet fully established connection.

Once the pod's network is frozen, the Agent can save the network state at 312. When finished, the Agent can notify the Manager that it has concluded its network state checkpoint, and reports its meta-data at 314. It can then proceed to perform the standalone pod checkpoint at 316. When the Manager has received the meta-data from all participating Agents at 304, the Manager can tell the Agents to continue at 306, and the Agents can unblock the network at 320. The network state can be saved on checkpoint before the pod state to enable more concurrent checkpoint operation by overlapping the standalone pod checkpoint time with the time it takes for the Manager to receive the meta-data from all participating Agents and indicate that they can continue.

The last action taken by the Agent can depend on the context of the checkpoint. If the application should continue to run on the same node after the checkpoint, the pod can be allowed to resume execution by sending a SIGCONT to all the processes. However, should the application processes migrate to another location, the Agent can destroy the pod locally and create a new one at the destination site. In both cases, a file-system snapshot (if desired) may be taken immediately prior to reactivating the pod.

Figure 4:
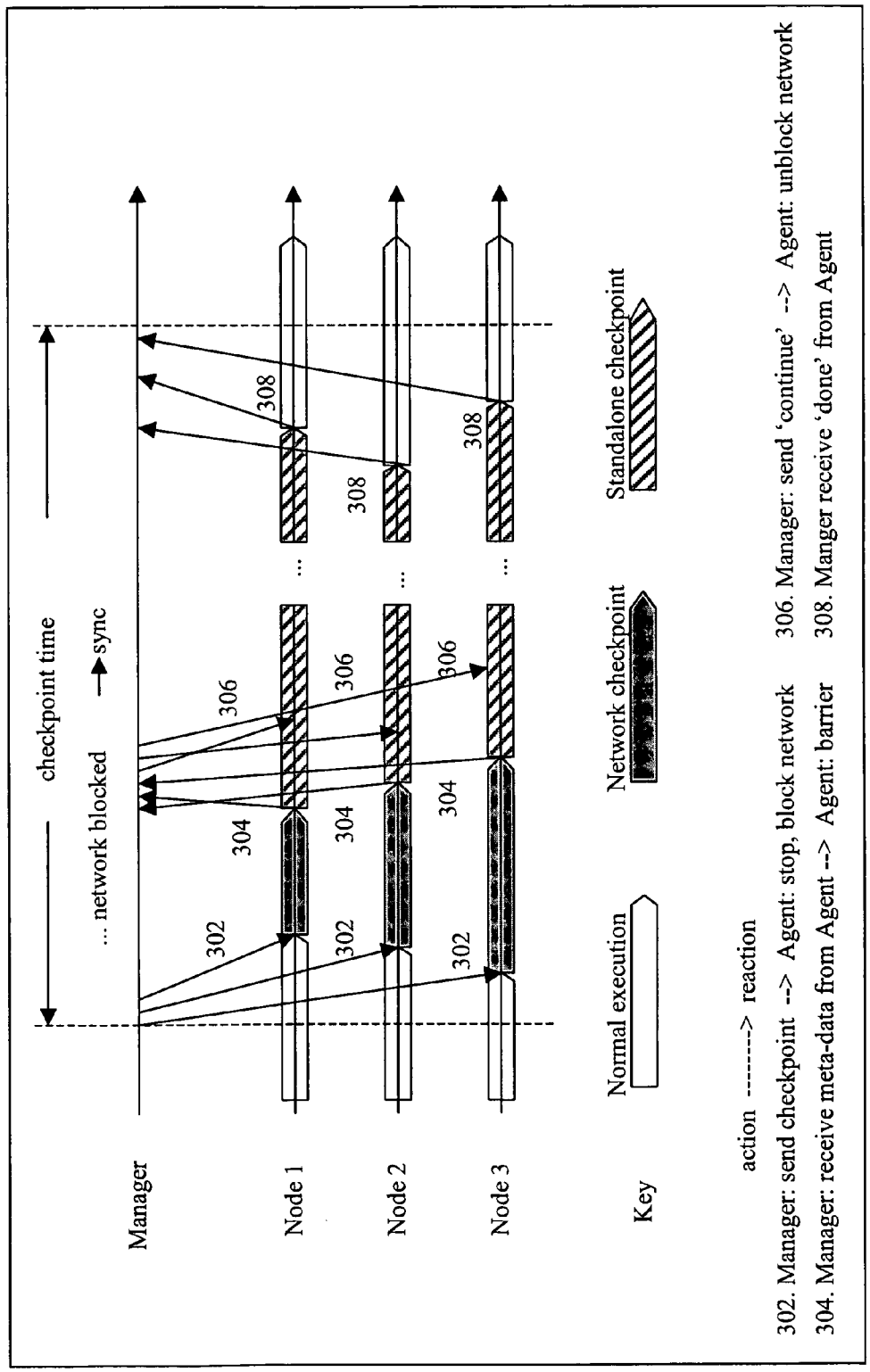
FIG. 4 is a diagram a timeline for performing a checkpoint of a distributed application, according to some embodiments.

FIG. 4 illustrates a checkpoint timeline that can be used in some embodiments. The timeline is labeled with numbers that correspond to the acts performed by the Manager as described in FIG. 3. The timeline shows that the entire checkpoint procedure can be executed concurrently in an asynchronous manner on all participating nodes for nearly its entire duration. FIG. 4 shows that the only synchronization point can be when the Manager receives meta-data from Agents and sends the continue message to the Agents. This single synchronization may be sufficient for the checkpoint procedure to be coherent and correct. The Agents can synchronize at the Manager before completing their standalone pod checkpoints and unblocking their networks. If not, it may be possible for one node to resume operation, re-engage in network activity, and deliver data to another node that had not begun its checkpoint. This may result in an inconsistent global state, as the state of the latter node will contain data that is not marked as sent in the already-saved state of the former.

The single synchronization may be sufficient because every pod ensures consistency by blocking its connections independently of other pods. Once a pod has blocked its connections, there may be no interaction with any other pod even if the network of other pods is not yet blocked. The pod may already be isolated and may not need to wait for all other pods to block their connections. By not having to wait for other pods initially, the network activity may only be blocked for the minimal required time.

A restart can be initiated by invoking the Manager with a list of tuples of the form <node, pod, URI>. This list describes the mapping of the application to nodes and pods, where URI indicates the location of the checkpoint data. A key requirement of the restart is to restore the network connections of the distributed application. Because the entire distributed application is to be restarted, the network checkpoint-restart mechanism can control both ends of each network connection, and can reconstruct the communicating sockets on both sides of each connection using a pair of connect and accept system calls. This can leverage the standard socket interface for creating network connections and results in a robust, easy to implement and highly portable approach.

Figure 5:
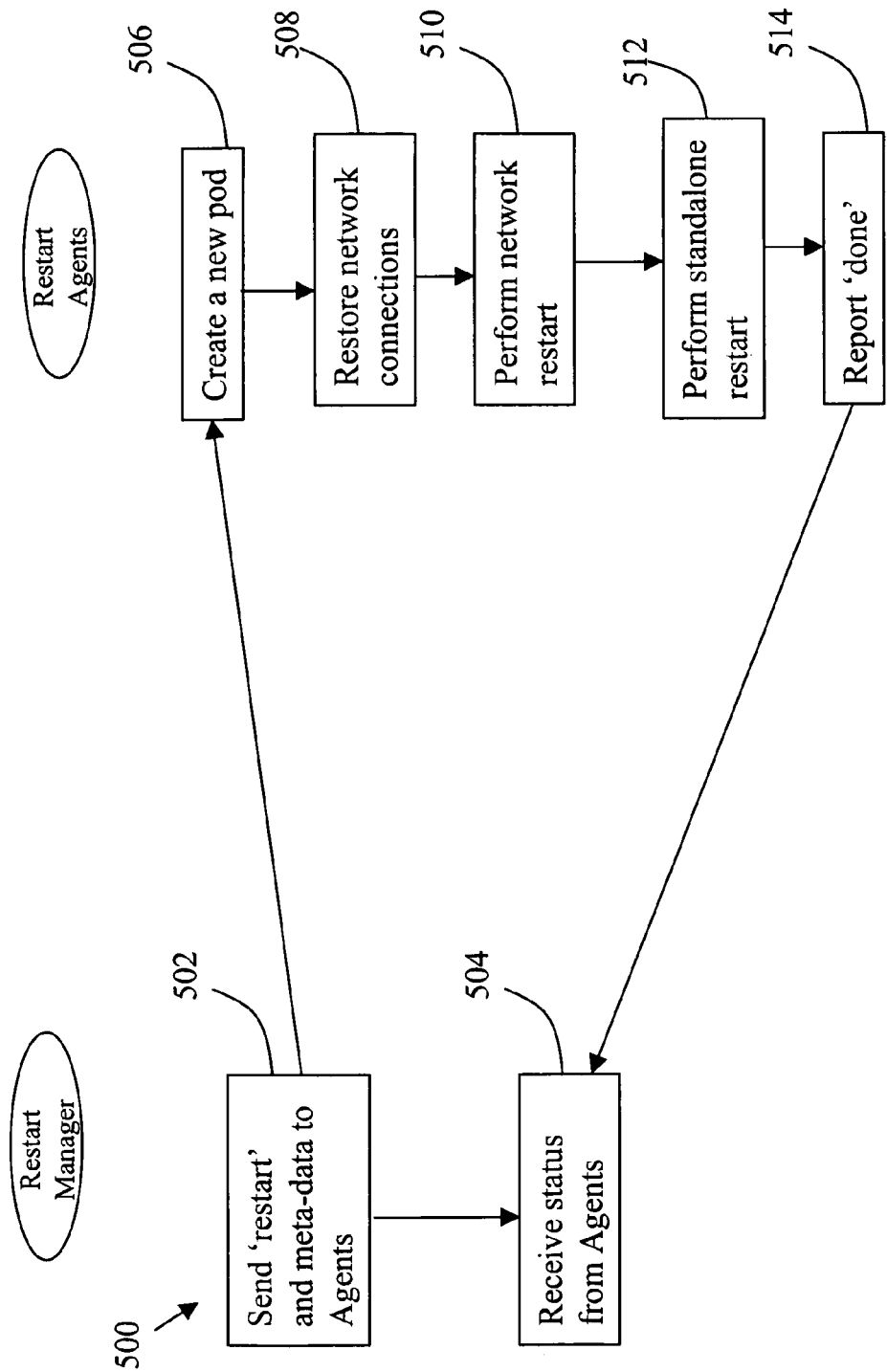
FIG. 5 is a diagram illustrating a method for restarting a distributed application, according to some embodiments.

FIG. 5 is a diagram illustrating a method 500 for restarting a distributed application, according to some embodiments. Given a restart request, the Manager can send a 'restart' command to all the Agents accompanied by a modified version of the meta-data at 502. The meta-data can be used to derive a new network connectivity map by substituting the destination network addresses in place of the original addresses. This outlines the desired mapping of the application to nodes/pods pairs. In the case of a restart on the same set of nodes (e.g., covering from a crash), the mapping may remain unmodified. In the case of migration, the mapping can reflect the settings of the alternate execution environment, particularly the network addresses at the target cluster.

As part of the modified meta-data, the Manager can provide a schedule that indicates for each connection which peer will initiate and which peer will accept. This can be performed by tagging each entry as either a connect or accept type. This can be determined arbitrarily, except when multiple connections share the same source port number. Source port numbers can be set by the application if not already taken or assigned automatically by the kernel; specifically when a TCP connection is accepted, it can inherit the source port number from the "listening" socket. To correctly preserve the source port number when shared by multiple connections, these connections must be created in a manner that resembles their original creation, as determined by the above schedule.

The Agents can respond to the Manager's commands by creating an empty pod into which the application will be restored at 506. The Agents then engage the local restart procedure, which can include recovering the network connectivity at 508, restoring the network state at 510, and executing the application standalone restart at 512. Once completed, the pod can be allowed to resume execution without further delay, and the Agents can report the 'done' status the Manager at 514.

The recovery of the network connectivity at 508 can be performed in user space. The meta-data that the Agent received from the Manager may completely describe the connectivity of the pod, and can be effectively used as a set of instructions to re-establish the desired connections. The Agent can loop over all the entries (each of type connect or accept), and perform the suitable action. If the state field is other than full-duplex, the status of the connection can be adjusted accordingly. For example, a closed connection can have a shutdown system call executed after the rest of its state has been recovered.

Generally, these connections cannot be executed in any arbitrary order, or a deadlock may occur. Consider for instance an application connected in a ring topology (each node has two connections—one at each side): a deadlock can occur if every node first attempts to accept a connection from the next node. To prevent such deadlocks, two threads of execution can be used. One thread can handle requests for incoming connections, and the other can establish connections to remote pods. Hence, there is no specific order at which connections requests should arrive at the Agent. This connectivity recovery scheme can be implemented in a portable way.

Once the network connectivity has been re-established at 508, the Agent can initiate the restart of the network-state at 510. This ensures that the exact previous state of all network connections are reinstated, namely connection status, receive queue, send queue and protocol specific state. Similarly, to the distributed checkpoint, this order of actions can avoid forced synchronization points between the nodes at later stages. In turn, this prevents unnecessary idle time, and increases concurrency by hiding associated latencies. With this framework, the only synchronization that is required is indirect and is induced by the creation of network connections. This restart scheme does not require that the network be disabled for any intermediate period. This scheme can also provide that no data, except data that is explicitly chosen to be sent, will be transmitted through the connection, until the application resumes execution (which will only occur at the end of the restart). The standalone restart can be invoked locally by each Agent after the network state has been successfully restored. To conclude the entire operation, each Agent can send a summary message to the Manager, specifying the completion status (failure or success) and the name of the new pod that has been created. The Manager can collect this data from all the Agents and report it back to the user.

The network-state of an application can be defined by the collection of the network-states of its communication endpoints. From the application's standing point, the primary abstraction of a communication endpoint is a socket. A socket is associated with a network protocol upon creation. The application can bind a socket to an address, connect to an address, accept a connection, as well as exchange data. The operating system can in turn keep a certain amount of state for each socket. The network-state checkpoint-restart is responsible for capturing and restoring this state.

The state of a socket can have three components: socket parameters, socket data queues and protocol specific state. The socket parameters describe socket properties related to its state, e.g., connected or not, and to its behavior, e.g., blocking or non-blocking I/O. The data queues—specifically send and receive queues, hold incoming and outgoing data respectively, which is handled by the network layer. Protocol specific data describes internal state held by the protocol itself. For instance, TCP connection state and TCP timers are part of its state.

Saving the state of the socket parameters is straightforward because the processes in the pod are suspended and cannot alter the socket state during a network state checkpoint. Also, the network may be blocked and only restarted later on after all the applications involved in the checkpoint have terminated their local network state checkpoint. Hence the socket parameters can be safely extracted at this point. Furthermore, these properties can be user-accessible via a standard interface provided by the operating system, namely getsockopt and setsockopt system calls. The entire set of the parameters can be included in the saved state. The socket's receive and send queues can be stored in the kernel. They hold intermediate data that has been received by the network layer but not yet delivered to (read by) the application, as well as data issued by the application that has not yet been transmitted over the network.

With unreliable protocols, it is normally not required to save the state of the queue. Packet loss is an expected behavior and should be accounted for by the application. If the restart does not restore a specific segment of data it can be interpreted as a legitimate packet loss. One exception, however, is if the application has already "peeked" at (that is, examined but not consumed) the receive queue. This is a standard feature in most operating system and is regularly used. To preserve the expected semantics, the data in the queue can be restored upon restart, since its existence is already part of the application's state. With reliable protocols, on the other hand, the queues are clearly an integral part of the socket state and cannot be dispensed of. Therefore, one may choose to always save the data in the queues, regardless of the protocol in question. The advantage is that it prevents causing artificial packet loss that would otherwise slowdown the application shortly after its restart, the amount of time it lingers until it detects the loss and fixes it by retransmission.

In both cases of reliable and unreliable protocols, data in transit can be safely ignored. Such data will either be dropped (for incoming packets) or blocked (for outgoing packets) by the network layer, since the pod's network is blocked for the duration of the checkpoint. With unreliable protocol, this is obviously an expected behavior. Reliable protocols will eventually detect the loss of the data and consequently retransmit it.

Saving the state of the receive queue and the send queue necessitates a method to obtain their contents. The method may be transparent and not entail any side-effects that may alter the contents of the queue. One approach is to read the data off the socket using the standard read system call, while at the same time injecting it back into the socket. The data may become attached to the socket as if it has just been restored. Using this approach, even though the receive queue is modified, the application can still be guaranteed to read this data prior to any new data arriving on the network, similar to other restored data.

The kernel typically does not provide an interface to insert data into the receive queue, and thus doing so may require knowledge of the underlying network protocol. This difficulty is overcome by observing that it is sufficient that the application consumes the restart data before any new data arrives to the socket. Therefore, an alternate receive queue can be allocated in which this data is deposited. The socket interface calls can then be interposed to ensure that future application requests will be satisfied with this data first, before access is made to the main receive queue. Clearly, the Checkpoint procedure may save the state of the alternate queue, if applicable (e.g., if a second checkpoint is taken before the application reads its pending data).

Technically, interposition can be realized by altering the socket's dispatch vector. The dispatch vector can determine which kernel function is called for each application interface invocation (e.g. open, write, read and so on). Specifically, three methods that may involve the data in the receive queue, recvmsg, poll and release, can be interposed. Interposition may only persist as long as the alternate queue contains data; when the data becomes depleted, the original methods can be reinstalled to avoid incurring overhead for regular socket operation.

Interposing on recvmsg can be used for using the alternate queue as the source for the data. The poll method can be included since it provides asynchronous notification and probing functionality by examination of the receive queue. Finally, the release method can be used to properly handle cleanup (in case the data has not been entirely consumed before the process terminates).

Extracting the contents of the send queue can be performed by inspecting the socket's send queue using standard in-kernel interface to the socket layer (normally used by protocol code and device drivers). This can be accomplished without altering the state of the send queue itself. While the receive queue is tightly coupled to the protocol specifics and roughly reflects the random manner in which the packets arrived, the send queue is more well organized according to the sequence of data send operations issued by the application.

Restoring the state of the send queue can be performed as follows. Given the re-established connection, the data can be resent by means of the standard write system call. The underlying network layer will take care of delivering the data safely to the peer socket. In the case of migration, a clever optimization is to redirect the contents of the send queue to the receiving pod and merge it with (or append to) the peer's stream of checkpoint data. Later during restart, the data will be concatenated to the alternate receive queue (of course, only after the latter has been restored). This will eliminate the need to transmit the data twice over the network: once when migrating the original pod, and then again when the send queue is processed after the pod resumes execution. Instead it can merge both into a single transfer, from the source pod to the destination pod.

The following describes how to save and restore protocol specific state information. The portion of this state that records the protocol properties is exported to the socket layer and can be accessed by the applications. TCP options that activate and deactivate keep-alive timers (TCP_KEEPALIVE), and semantics of urgent data interpretation (TCP_STDURG) are two such examples. The saved state information includes the entire set of these options, and they can be handled in a similar way to the socket options, as discussed above. The remaining portion of the state information is internal, and holds dynamic operational data. Unlike accessing the socket layer which is a common practice in kernel modules, access to the protocol's state requires intimate knowledge of its internals. Restoring such a state entails carefully handcrafted imitation of the protocol's behavior. If a portable solution is sought, the minimal state that must be extracted can be identified. As discussed before, the minimal state for unreliable protocols is nil, inherently to their nature. With reliable protocols, the internal state typically keeps track of the dynamics of the connection to guarantee delivery of messages. Data elements are tagged with a sequence numbers, and the protocol records the sequence number of data that has been transmitted but not yet acknowledged. Timers are deployed to trigger resubmission of unacknowledged data (on the presumption that it had been lost), and to detect broken connections. Each peer in a connection tracks three sequence numbers: last data sent (sent), last data received (recv) and last data acknowledged by the other peer (acked).

Figure 6:
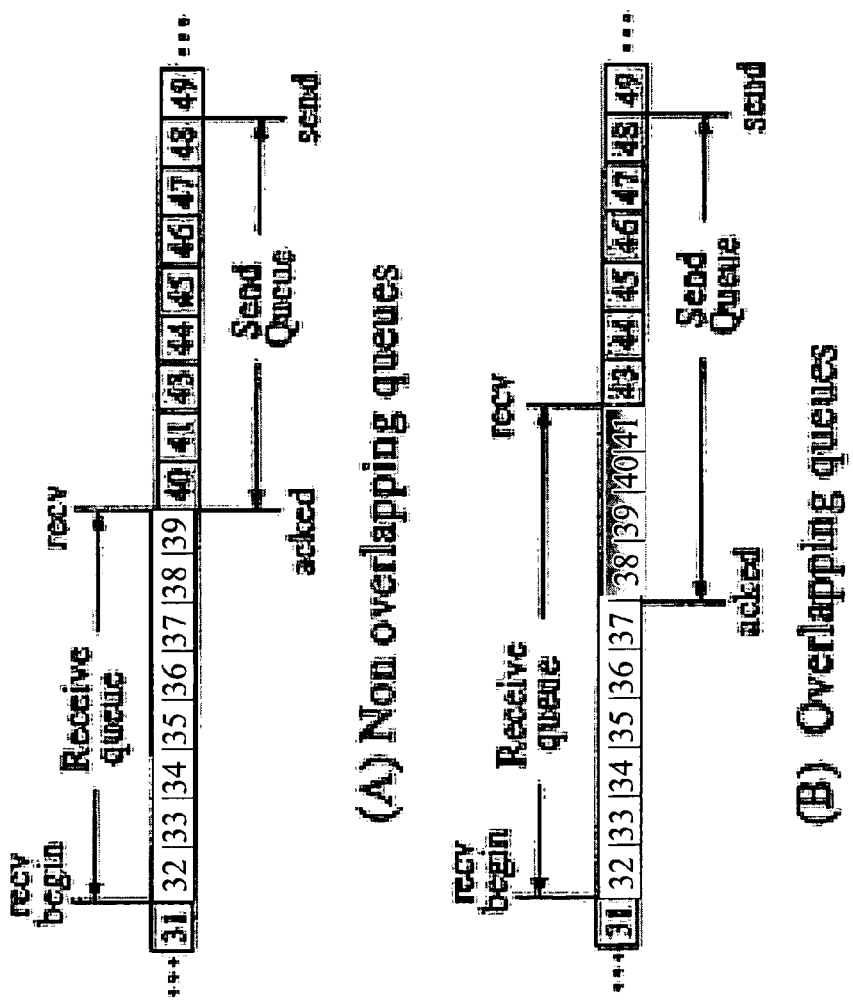
FIG. 6 is a diagram depicting examples of network state information.

An important property of reliable protocols is the following invariant: $recv_1 > acked_2$ (where the subindices 1 and 2 designate the peers of connection). The reason is that upon receiving data, a peer updates its recv value, and sends an acknowledgment. If the acknowledgment is not lost, it will arrive with some small delay, and then the other peer will update its acked value. It follows that a send queue always holds data between acked and sent—that is the unacknowledged data. The receive queue holds data from some point back in time until recv. If $recv_1 > acked_2$, there is some overlap between the two queues. This setting is depicted in FIG. 6. The overlap can be fixed during the restart operation, before the application consumes duplicate data. This can be done by discarding extraneous data from either queue. It is more advantageous to discard that of the send queue to avoid transferring it over the network.

To ensure correct restart of a connection, recv and acked values can be captured on both peers. This data, along with additional protocol specific information, is located in a protocol-control-block (PCB) data structure that is associated with every TCP socket. The concept of a PCB is ubiquitous to the TCP stack, although the details of its layout differ between distinct implementations. It follows that the need to access these fields does not impair the portability of the disclosed subject matter, but merely requires a trivial adjustment per implementation.

Some applications employ timeout mechanisms on top of the native protocol, as a common technique to detect soft faults and dead locks, or to expire idle connections. They are also used to implement reliable protocols on top of unreliable ones (e.g. over UDP). The mechanisms typically maintain a time-stamp for each connection, updating its value whenever there is activity involving the connection. Time-stamps are inspected periodically, and the appropriate action is triggered if the value is older than a predefined threshold.

It follows that if there is sufficient delay between the checkpoint and the restart, certain applications may experience undesired effects if the timer value exceeds the threshold and expires. This can be resolved by virtualizing those system calls that report time. During restart the difference between the current time and the current time as recorded during checkpoint can be computed. Responses to subsequent inquiries of the time are then biased by that delay. Standard operating system timers owned by the application can also be virtualized. At restart, their expiry time is set in a similar manner by calculating the delta between the original clock and the current one. This type of virtualization is optional, and can be turned on or off per application as necessary (so that application that strictly require knowledge of the absolute time can operate normally).

Although some examples presented above relate to the Linux operating system, it will be apparent to a person skilled in the field that various embodiments can be implemented and/or used with any other operating systems, including, but not limited to, Unix and Windows operating systems. In addition, various embodiments are not limited to be used with computer clusters, but can be used with any suitable cluster of digital processing devices. Digital processing devices can include, for example, computers, set-top boxes, mobile computing devices such as cell phones and Personal Digital Assistants (PDAs), and other embedded systems.

Figure 7:
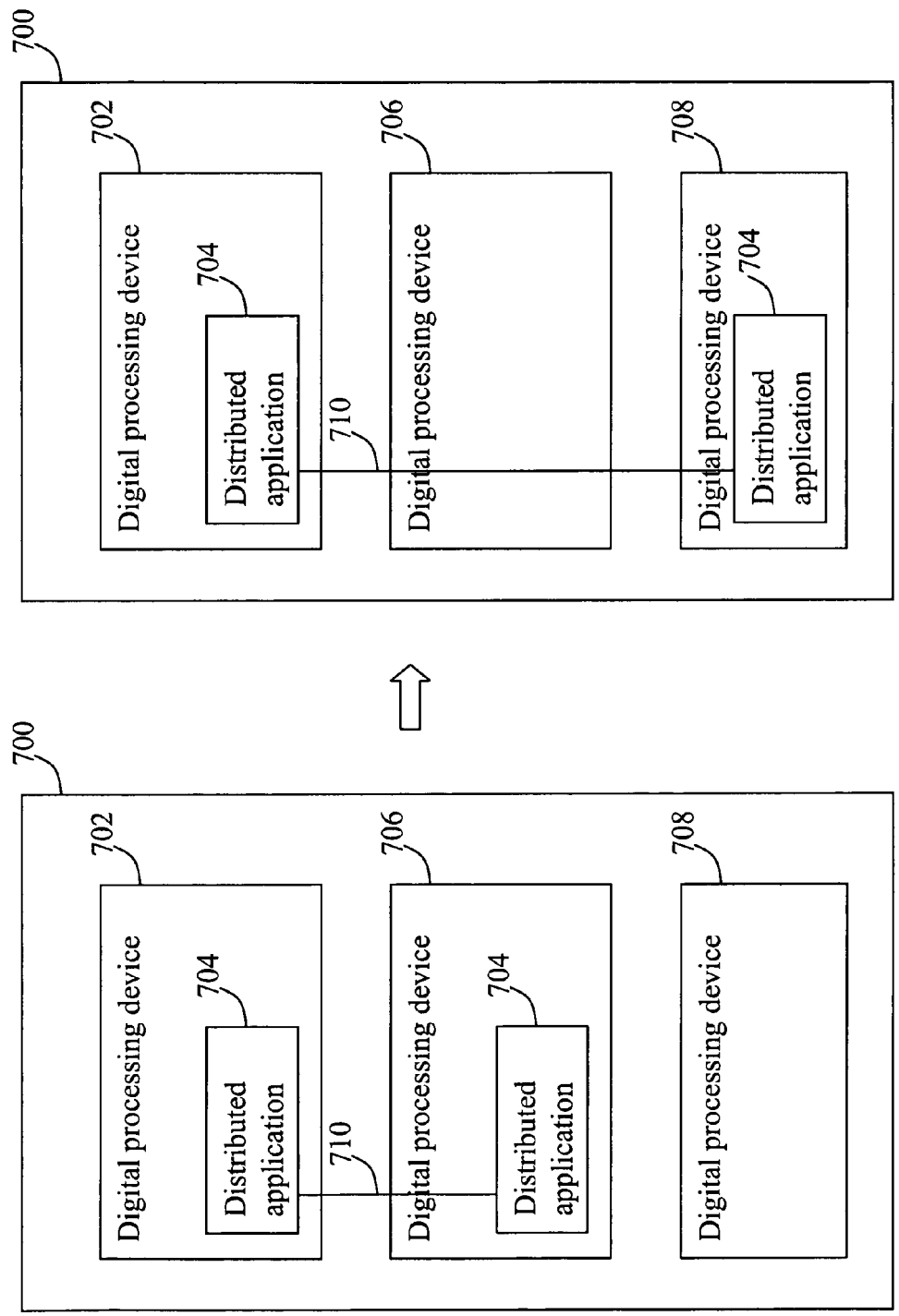
FIG. 7 is a block diagram of a system according to some embodiments.

FIG. 7 is a diagram illustrating system 700 of some embodiments. As shown, system 700 can include digital processing devices 702, 706, and 708. Distributed application 704 can run, for example, on digital processing devices 702 and 706, within virtualized operating system environments, with network connection 710 between processes relating to distributed application 704 on devices 702 and 706. System 700 can migrate distributed application 704, for example, to devices 702 and 708, preserving connection 710. The migration may include suspending distributed application 704 related processes, saving network state information relating to network connection 710, recreating network connection 710 using the saved network state information, and restarting distributed application 704 using the stored process information on devices 702 and 708.

Other embodiments, extensions, and modifications of the ideas presented above are comprehended and within the reach of one skilled in the field upon reviewing the present disclosure. Accordingly, the scope of the present invention in its various aspects is not to be limited by the examples and embodiments presented above. The individual aspects of the present invention, and the entirety of the invention are to be regarded so as to allow for modifications and future developments within the scope of the present disclosure. The present invention is limited only by the claims that follow.

What is claimed is:

1. A method for managing a distributed application running in a plurality of digital processing devices, comprising:
   running a first application endpoint of the distributed application in a first virtualized operating system environment in a first of the plurality of digital processing devices;
   running a second application endpoint of the distributed application in a second virtualized operating system environment in a second of the plurality of digital processing devices, wherein the second application endpoint communicates with the first application endpoint via a network connection in a communication network;
   sending first messages from the first application to the plurality of digital processing devices to initiate suspending;
   suspending the first application endpoint and the second application endpoint;
   saving network state information relating to the network connection, wherein saving network state information comprises sending network state information from the plurality of digital processing devices to the first application;
   recreating the network connection using the saved network state information;
   sending second messages from the first application to the plurality of digital processing devices to enable network activity of the first application endpoint and the second application endpoint;
   generating one or more signals to coordinate a restarting of (i) the first application endpoint in one of the first of the plurality of digital processing devices and a third of the plurality of digital processing devices and (ii) the second application endpoint in one of the second of the plurality of digital processing devices and a fourth of the plurality of digital processing devices; and
   restarting the first application endpoint and the second application endpoint using stored process information.

2. The method of claim 1, wherein information relating to network connections comprises at least one of network state, a state of socket parameters, and a protocol control block.

3. The method of claim 1, wherein the suspending comprises disabling network activity of the first application endpoint and the second application endpoint.

4. The method of claim 3, wherein the suspending comprises disabling network activity of the first application endpoint and the second application endpoint using, a network filtering service.

5. The method of claim 1, further comprising, for each of the plurality of digital processing devices, storing process information after saving network state information.

6. The method of claim 1, wherein, for each of the plurality of digital processing devices, restarting the first application endpoint and the second application endpoint occurs after recreating the network connections.

7. A non-transitory computer-readable medium containing computer-executable instructions that, when executed by a processor, cause the processor to perform a method for managing a distributed application running in a plurality of digital processing devices, comprising:

running a first application endpoint of the distributed application in a first virtualized operating system environment in a first of the plurality of digital processing devices;

running a second application endpoint of the distributed application in a second virtualized operating system environment in a second of the plurality of digital processing devices, wherein the second application endpoint communicates with the first application endpoint via a network connection in a communication network;

sending first messages from the first application to the plurality of digital processing devices to initiate suspending;

suspending the first application endpoint and the second application endpoint;

saving network state information relating to the network connection, wherein saving network state information comprises sending network state information from the plurality of digital processing devices to the first application;

recreating the network connection using the saved network state information;

sending second messages from the first application to the plurality of digital processing devices to enable network activity of the first application endpoint and the second application endpoint;

generating one or more signals to coordinate a restarting of (i) the first application endpoint in one of the first of the plurality of digital processing devices and a third of the plurality of digital processing devices and (ii) the second application endpoint in one of the second of the plurality of digital processing devices and a fourth of the plurality of digital processing devices; and restarting the first application endpoint and the second application endpoint using stored process information.

8. The non-transitory computer-readable medium of claim 7, wherein information relating to network connections comprises at least one of network state, a state of socket parameters, and a protocol control block.

9. The non-transitory computer-readable medium of claim 7, wherein the suspending comprises disabling network activity of the first application endpoint and the second application endpoint.

10. The non-transitory computer-readable medium of claim 9, wherein the suspending comprises disabling network activity of the first application endpoint and the second application endpoint using a network filtering service.

11. The non-transitory computer-readable medium of claim 7, wherein the method further comprises, for each of the plurality of digital processing devices, storing process information after saving network state information.

12. The non-transitory computer-readable medium of claim 7, wherein, for each of the plurality of digital processing devices, restarting the first application endpoint and the second application endpoint occurs after recreating the network connections.

13. A system for managing a distributed application, comprising a plurality of interconnected digital processing devices configured to run a first application endpoint of the distributed application in a first virtualized operating system environment, run a second application endpoint of the distributed application in a second virtualized operating system environment in a second of the plurality of digital processing devices, wherein the second application endpoint communicates with the first application endpoint via a network connection in a communication network, send first messages from the first application to the plurality of digital processing devices to initiate suspend, suspend the first application endpoint and the second application endpoint, save network state information relating to the network connection, wherein save network state information comprises sending network state information from the plurality of digital processing devices to the first application, recreate the network connection using the saved network state information, send second messages from the first application to the plurality of digital processing devices to enable network activity of the first application endpoint and the second application endpoint, generate one or more signals to coordinate a restarting of (i) the first application endpoint in one of the first of the plurality of digital processing devices and a third of the plurality of digital processing devices and (ii) the second application endpoint in one of the second of the plurality of digital processing devices and a fourth of the plurality of digital processing devices, and restart the first application endpoint and the second application endpoint using stored process information.

* * * * *

UNITED STATES PATENT AND TRADEMARK OFFICE
CERTIFICATE OF CORRECTION

PATENT NO.        : 8,280,944 B2
APPLICATION NO.   : 11/584313
DATED             : October 2, 2012
INVENTOR(S)       : Oren Laadan et al.

It is certified that error appears in the above-identified patent and that said Letters Patent is hereby corrected as shown below:

Col. 16, line 61
Claim 4, line 3, "using, a network" should be --using a network--.

Signed and Sealed this
Nineteenth Day of March, 2013

Teresa Stanek Rea
*Acting Director of the United States Patent and Trademark Office*